United States Patent [19]
Sato et al.

[11] Patent Number: 5,467,299
[45] Date of Patent: Nov. 14, 1995

[54] DIVIDER AND MICROCOMPUTER INCLUDING THE SAME

[75] Inventors: Fumiki Sato; Kouichi Fujita, both of Itami, Japan

[73] Assignee: Mitsubishi Denki Kabushiki Kaisha, Tokyo, Japan

[21] Appl. No.: 206,585

[22] Filed: Mar. 7, 1994

[30] Foreign Application Priority Data

Mar. 30, 1993 [JP] Japan .................................... 5-071542

[51] Int. Cl.$^6$ .................................................. G06F 7/52
[52] U.S. Cl. ........................................ 364/761; 364/746.2
[58] Field of Search .................................. 364/761, 746.2

[56] References Cited

U.S. PATENT DOCUMENTS

| | | | |
|---|---|---|---|
| 4,878,190 | 10/1989 | Darley et al. | 364/761 |
| 5,012,439 | 4/1991 | Nash et al. | 364/746.2 |
| 5,132,925 | 7/1992 | Kehl et al. | 364/761 |
| 5,153,847 | 10/1992 | Takagi et al. | 364/746.2 |

FOREIGN PATENT DOCUMENTS

| | | |
|---|---|---|
| 63-49836 | 3/1988 | Japan . |
| 2-112023 | 4/1990 | Japan . |
| 3-102519 | 4/1991 | Japan . |

OTHER PUBLICATIONS

"A New Carry–Free Division Algorithm and Its Application to a Single–Chip 1024–b RSA Processor", IEEE Journal of Solid–State Circuits, vol. 25, No. 3, Jun. 1990, pp. 748–756.

*Primary Examiner*—Tan V. Mai
*Attorney, Agent, or Firm*—Lowe, Price, LeBlanc & Becker

[57] ABSTRACT

A subtraction-shift-type divider using a dividend or partial remainder represented by signed digits taking any of the values –1, 0, 1 and a divisor by twos complement representation. A selector, responding to values of a quotient digit at respective time points during the execution of division, converts the divisor into any of the same value, inverted value or "0" for outputting. An adder adds (subtracts) a partial remainder and 1 or 0. A quotient digit deciding circuit decides the next quotient digit from the quotient digits at respective time points during the execution of division, and a portion of the partial remainder obtained by the adder. The number of transistors constituting an actual circuit can be reduced by using a redundant signal digit (RSD) representation in the same way as the prior art and simplifying tables for deciding the quotient digit.

3 Claims, 23 Drawing Sheets

(a)

(b)

| X | Y | Z | Q2 | Q1 |
|---|---|---|----|----|
| 1 | 1 | 1 | 1  | 1  |
| 1 | 1 | 0 | 0  | 0  |
| 1 | 0 | 1 | 0  | 0  |
| 1 | 0 | 0 | 0  | 1  |
| 0 | 1 | 1 | 1  | 0  |
| 0 | 1 | 0 | 1  | 1  |
| 0 | 0 | 1 | 1  | 1  |
| 0 | 0 | 0 | 0  | 0  |

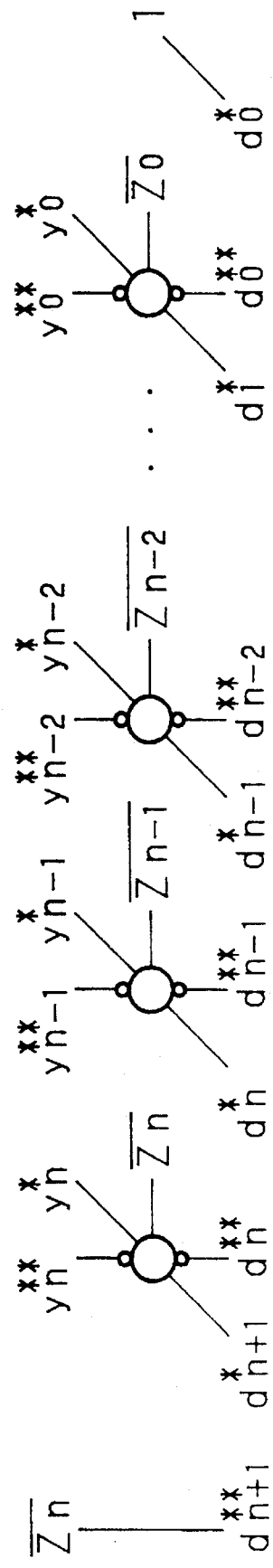

Fig. 4
Prior Art (a) WHEN D>0

| r₀ | r₁ | r₂ | qj |
|---|---|---|---|
| 1 | 0 | 1 | 1 |
| 1 | 0 | 0 | 1 |
| 1 | 0 | $\bar{1}$ | 1 |
| 1 | $\bar{1}$ | 1 | 1 |
| 1 | $\bar{1}$ | 0 | 1 |
| 1 | $\bar{1}$ | $\bar{1}$ | 0 |
| 0 | 1 | 1 | 1 |
| 0 | 1 | 0 | 1 |
| 0 | 1 | $\bar{1}$ | 0 |
| 0 | 0 | 1 | 0 |
| 0 | 0 | 0 | 0 |
| 0 | 0 | $\bar{1}$ | $\bar{0}$ |
| 0 | $\bar{1}$ | 1 | $\bar{0}$ |
| 0 | $\bar{1}$ | 0 | $\bar{1}$ |
| 0 | $\bar{1}$ | $\bar{1}$ | $\bar{1}$ |
| $\bar{1}$ | 1 | 1 | $\bar{0}$ |
| $\bar{1}$ | 1 | 0 | $\bar{1}$ |
| $\bar{1}$ | 1 | $\bar{1}$ | $\bar{1}$ |
| $\bar{1}$ | 0 | 1 | $\bar{1}$ |
| $\bar{1}$ | 0 | 0 | $\bar{1}$ |
| $\bar{1}$ | 0 | $\bar{1}$ | $\bar{1}$ |

(b) WHEN D<0

| r₀ | r₁ | r₂ | qj |
|---|---|---|---|
| 1 | 0 | 1 | $\bar{1}$ |
| 1 | 0 | 0 | $\bar{1}$ |
| 1 | 0 | $\bar{1}$ | $\bar{1}$ |
| 1 | $\bar{1}$ | 1 | $\bar{1}$ |
| 1 | $\bar{1}$ | 0 | $\bar{1}$ |
| 1 | $\bar{1}$ | $\bar{1}$ | 0 |
| 0 | 1 | 1 | $\bar{1}$ |
| 0 | 1 | 0 | $\bar{1}$ |
| 0 | 1 | $\bar{1}$ | 0 |
| 0 | 0 | 1 | 0 |
| 0 | 0 | 0 | 0 |
| 0 | 0 | $\bar{1}$ | $\bar{0}$ |
| 0 | $\bar{1}$ | 1 | $\bar{0}$ |
| 0 | $\bar{1}$ | 0 | 1 |
| 0 | $\bar{1}$ | $\bar{1}$ | 1 |
| $\bar{1}$ | 1 | 1 | $\bar{0}$ |
| $\bar{1}$ | 1 | 0 | 1 |
| $\bar{1}$ | 1 | $\bar{1}$ | 1 |
| $\bar{1}$ | 0 | 1 | 1 |
| $\bar{1}$ | 0 | 0 | 1 |
| $\bar{1}$ | 0 | $\bar{1}$ | 1 |

Fig. 5

(a)  
WHEN D>0

| $X_2$ | $X_1$ | $X_0$ | $q_{j+1}$ |
|---|---|---|---|
| $\bar{1}$ | x | x | $q_j$ |
| 0 | $\bar{1}$ | x | $\bar{1}$ |
| 0 | 0 | $\bar{1}$ | $\bar{1}$ |
| 0 | 0 | 0 | 0 |
| 0 | 0 | 1 | 1 |
| 0 | 1 | x | 1 |
| 1 | x | x | $q_j$ |

(b)  
WHEN D<0

| $X_2$ | $X_1$ | $X_0$ | $q_{j+1}$ |
|---|---|---|---|
| $\bar{1}$ | x | x | $q_j$ |
| 0 | $\bar{1}$ | x | 1 |
| 0 | 0 | $\bar{1}$ | 1 |
| 0 | 0 | 0 | 0 |
| 0 | 0 | 1 | $\bar{1}$ |
| 0 | 1 | x | $\bar{1}$ |
| 1 | x | x | $q_j$ |

Fig. 9

| $d_i$ | $q_j^{**}$ | $q_j^{*}$ | Z |
|---|---|---|---|
| 0 | 0 | 0 | 0 |
| 0 | 0 | 1 | 1 ($\overline{d_i}$) |
| 0 | 1 | 0 | 0 ($d_i$) |
| 0 | 1 | 1 | 0 |
| 1 | 0 | 0 | 0 |
| 1 | 0 | 1 | 0 ($\overline{d_i}$) |
| 1 | 1 | 0 | 1 ($d_i$) |
| 1 | 1 | 1 | 0 |

Fig. 10

| $Z_i$ | $R^{**}_{j,i}$ | $R^{*}_{j,i}$ | $R^{**}_{j+1,i}$ | $R^{*}_{j+1,i+1}$ |
|---|---|---|---|---|
| 0 | 0 | 0 | 0 | 0 |
| 0 | 0 | 1 | 1 | 1 |
| 0 | 1 | 0 | 1 | 0 |
| 0 | 1 | 1 | 0 | 0 |
| 1 | 0 | 0 | 1 | 1 |
| 1 | 0 | 1 | 0 | 1 |
| 1 | 1 | 0 | 0 | 0 |
| 1 | 1 | 1 | 1 | 1 |

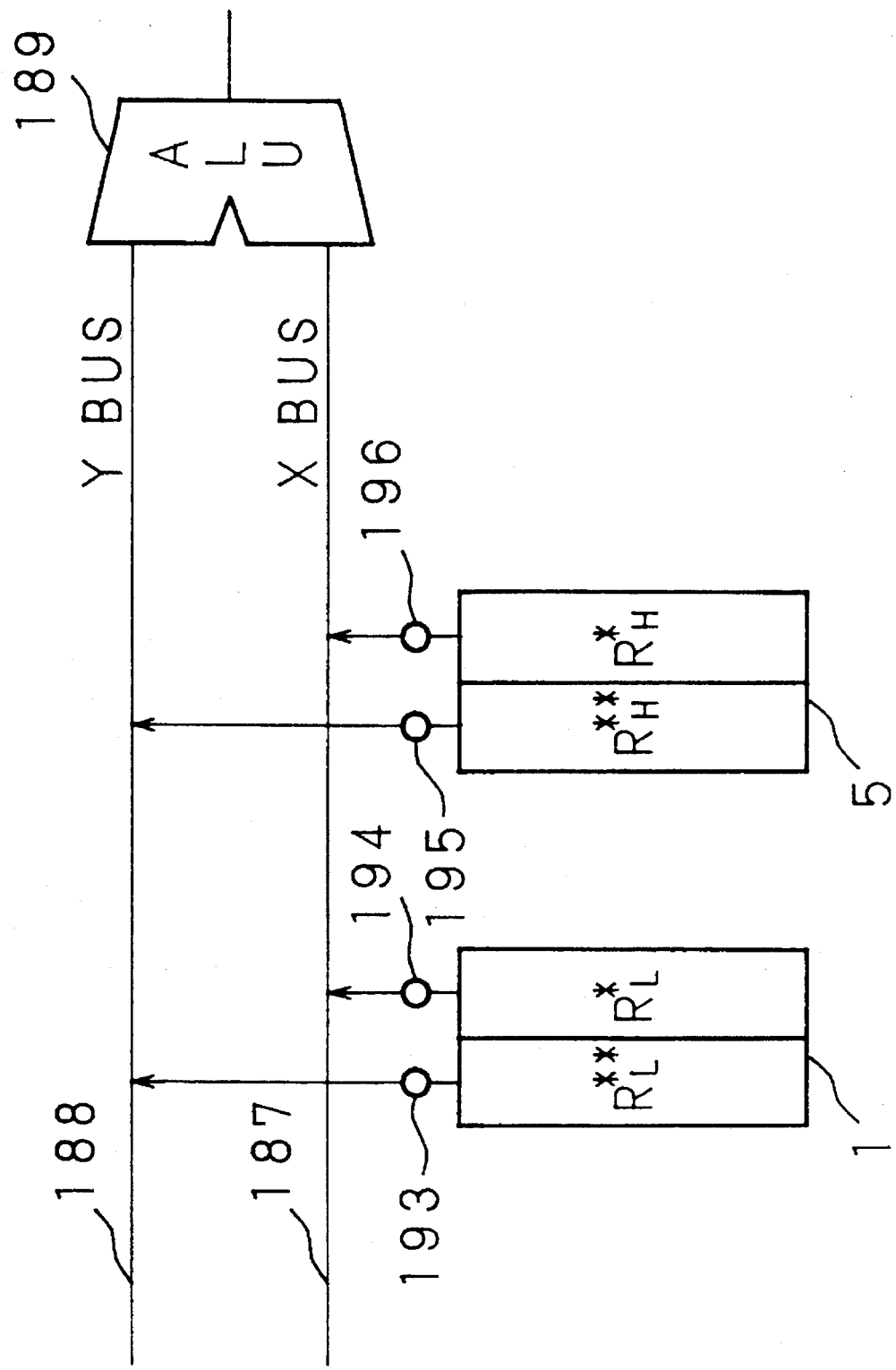

DIVIDER AND MICROCOMPUTER INCLUDING THE SAME

BACKGROUND OF THE INVENTION

1. Field of the Invention

The present invention relates to a divider, and particularly, relates to a subtraction-shift-type divider and a microcomputer including such divider

2. Description of the Related Art

A principle of subtraction shift-type-division which performs a subtraction between a dividend or partial remainder by RSD representation and a divisor by twos complement representation is shown in pages 748 to 756 of the IEEE, Journal of Solid-State Circuit, Vol. 25, No. 3 (June, 1990).

Though various propositions are made as a divider and a processor conforming to the division principle shown in this journal, typical ones are Japanese Patent Application Laid-Open No. 63-49836 (1988), Japanese Patent Application Laid-Open No. 3-102519 (1991) and Japanese Patent Application Laid-Open No. 2-112023 (1990)

A number by RSD (Redundant Signed Digit) representation is a numerical representation which represents the number of each digit, by $\{-1, 0, 1\}$, and is expressed as Y in the following expression.

$$Y = \sum_{i=0}^{n} (Y_i^{**} - Y_i^*) \cdot 2^i; Y_i^{**}, Y_i^* \in \{0, 1\}$$

While, a number by twos complement representation is expressed as Z in the following expression.

$$Z = -2^n \cdot Z_n + \sum_{i=0}^{n-1} Z_i \cdot 2^i; Z_n, Z_i \in \{0, 1\}$$

The above mentioned number Y by RSD representation and the number Z by twos complement representation are added as shown in a schematic diagram of FIG. 1, and their sum S is obtained as a number by RSD representation shown in the following expression.

$$S = \sum_{i=0}^{n+1} (S_i^{**} - S_i^*) \cdot 2^i; S_i^{**}, S_i^* \in \{0, 1\}$$

In FIG. 1, symbols of large ○ respectively designate full adders, arid symbols of small ○ respectively designate inverted inputs to or inverted outputs from the full adders.

FIG. 2(a) is a schematic diagram showing inputs and outputs to and from the full adder shown in FIG. 1, and FIG. 2(b) is a truth table therebetween.

While, the number Y by RSD representation and the number Z by twos complement representation are subtracted as shown in a schematic diagram of FIG. 3, and their difference D is obtained is the number by RSD representation shown in the following expression.

$$D = \sum_{i=0}^{n+1} (D_i^{**} - D_i^*) \cdot 2^i; D_i^{**}, D_i^* \in \{0, 1\}$$

In FIG. 3, in the same way as FIG. 1, the symbols of large C) respectively designate the full adders and the symbols of small ○ respectively designate the inverted inputs to or the inverted outputs from the full adders Truth tables of the full adders shown in FIG. 3 are similar to that shown in FIG. 2(b).

Such addition and subtraction of the number Y by RSD representation and the number Z by twos complement representation can be performed rapidly because of free from carry propagations.

In a subtraction-shift-type divider, a quotient digit $q_j$ is selected to satisfy the following expressions (1) and (2) with respect to the partial remainder (dividend) $R_j$ and the divisor D.

$$R_{j+1} = 2 \cdot (R_j - q_j D) \qquad (1)$$

$$-2 \cdot |D| < R_{j+1} < 2 \cdot |D| \qquad (2)$$

A selective process of the quotient digit $q_j$ satisfying the expressions (1) and (2) is not one and only but somewhat optional. For example, in a restoring division, with respect to the positive partial remainder (dividend) $R_j$ and divisor D, the quotient $q_j$ is $$q_j \in \{0, 1\}, \text{ and}$$

in an unrestoring division, $$q_j \in \{-1, 1\}$$

It is also possible to have $$q_j \in \{-1, 0, 1\},$$

and these are used in the principle of division in the aforementioned journal.

Now, in the principle of division in the aforementioned journal, the quotient digit $q_j$ is decided according to a table as shown in FIG. 4(a) when the divisor D is positive, and according to a table as shown in FIG. 4(b) when the divisor D is negative. However, hereupon, the divisor D and the partial remainder $R_j$ are as shown in the following expression, wherein $r_0$, $r_1$, $r_2$ in FIG. 4(a) and FIG. 4(b) respectively show $r_{j,0}$, $r_{j,1}$, $r_{j,2}$ in the following expression.

$$D = -2^0 \cdot d_0 + \sum_{i=1}^{n} d_i \cdot 2^{-i}; d_i \in \{0, 1\} \wedge d_0 \neq d_1$$

$$R_j = \sum_{i=0}^{n+m-j} r_{j,i} \cdot 2^{-i}; r_{j,i} \in \{-1, 0, 1\}$$

In this way, in the above-mentioned prior art, since there is no carry propagation in a division cycle, the division can be performed rapidly. Also, since the remainder is given in a binary difference, it is easy to convert it into a twos complementary representation.

However, since the tables for deciding the quotient digit are complicated, at the time of realizing quotient digit deciding means in integrated circuits and the like as actual circuits, a large number of transistors are required.

Besides, the divisor value must be standardized.

Furthermore, when the divisor is "−1", the divisor must be extended in a lower direction to make a least significant bit apparently "0".

Also, since such divider as aforementioned can not directly give and take data between a CPU and an ALU of a usual microcomputer, it is necessary to convert it into the twos complementary representation.

SUMMARY OF THE INVENTION

The present invention has been devised in view of such circumstances, therefore, it is an object thereof to provide a divider, in which, in the same way as the prior art, an RSD representation is used and tables for deciding a quotient digit are simplified to reduce the number of transistors in case of constituting an actual circuit.

It is another object of the present invention to provide a divider in which a divisor is not necessarily standardized, by extracting a portion to be inputted to quotient digit deciding means from a partial remainder according to the divisor value to decide the quotient digit.

It is a further object of the present invention to provide a divider, in which division can be performed even when the divisor is "−1", just by increasing a small number of transistors in case of constituting the actual circuit.

It is still another object of the present invention to provide a microcomputer, in which a dividend and a divisor can be written into the divider as above-mentioned effectively from a CPU.

It is a still further object of the present invention to provide a microcomputer, in which a quotient and a remainder can be read effectively into the CPU from the divider as above-mentioned.

The divider of the present invention is the subtraction-shift-type divider using the dividend or partial remainder represented by signed digits taking any of the values −1, 0, 1 and divisor by twos complement representation, and comprises: converting means which, responding to values of quotient digit at respective time points during the execution of division, converts the divisor into any of the same value inverted value or "0" for outputting; adding means which adds or subtracts the partial remainder, output of the converting means, and 1 or 0, and next quotient digit deciding means which decides the next quotient digit from the quotient digits at respective time points during the executing of division and a portion of partial remainder obtained by the addition or subtraction of the adding means responding thereto.

The divider of the present invention is the subtraction-shift-type divider using the dividend or partial remainder represented by signed digits taking any of the values −1, 0, 1 and a divisor by twos complement representation, and comprises: converting meads which converts the divisor responding to quotient digit at respective time points during the execution of division; adding means which adds or subtracts the partial remainder, output of the converting means and 1 or 0; next quotient digit deciding means which, responding to the quotient digits at respective time points during the execution of division, decides the next quotient digit using a portion of the partial remainder obtained by the subtraction of the adding means; and extracting means which, responding to a value of the divisor, extracts a portion from the partial remainder so as to decide the next quotient digit by the next quotient digit deciding means.

Furthermore, the divider of the present invention is the subtraction-shift-type divider using the dividend or partial remainder represented by a singed digit taking any of the values −1, 0, 1 and a divisor by twos complement representation, and comprises: converting means which, responding to values of quotient digit at respective time points during the execution of division, converts the divisor; adding means which adds or subtracts the partial remainder, output of the converting means and 1 or 0; next quotient digit deciding means which, responding to the quotient digits at respective time points during the execution of division, decides the next quotient digit using a portion of the partial remainder obtained by the subtraction of the adding means; extracting means which, responding to a value of the divisor, extracts a portion from the partial remainder so as to decide the next quotient digit by the next quotient deciding means; and means for converting the divisor into "−2" when it is "−1".

A microcomputer of the present invention comprises: a divider, using the dividend or partial remainder represented by signed digits taking any of the values −1, 0, 1, and including a first register holding a non-positive portion of the dividend, a second register holding a non-negative portion of the dividend and a third register holding the divisor; and an ALU respectively connected to the first and second registers via a first bus and to the third register via a second bus.

A microcomputer of the present invention comprises: a divider, in which a quotient or remainder represented by a singed digit taking any of the values −1, 0, 1 is used, and including a first register holding a non-positive portion of the quotient, a second register holding a non-positive portion of the remainder, a third register holding a non-negative portion of the quotient and fourth register holding a non-negative portion of the reside; and an ALU respectively connected to the first and third registers via a first bus and to the second and fourth registers via a second bus.

In the divider of the present invention, responding to the quotient digits at respective the points during the execution of division, the divisor is converted into any of the same value inverted value and "0" by the converting means, and the next quotient digit is decided by the next quotient digit deciding means from the quotient digits at respective time points during the division, and a portion of the partial reminder obtained by the addition or subtraction of the adding means responding thereto.

In the divider of the present invention, responding to the quotient digits at respective time points during the execution of division, the divisor is converted by the converting means, and the next quotient digit is decided by the next quotient digit deciding means, using a portion of the partial remainder obtained by the subtraction of the adding means, responding to the quotient digits at respective time points during the execution of division, and further, responding to the divisor value, a portion of the partial remainder is extracted by the extracting means to decide the next quotient digit by the next quotient digit deciding means.

Furthermore, in the divider of the present invention, in addition to the above, the divisor is converted into "−2" for division when it is "−1".

In the microcomputer of the present invention, the division is performed by the divider, by writing a most significant digit of the dividend by twos complement representation into the first register, and all of the other digits of the dividend into the second register respectively through the first bus, and at the same time, by clearing the portions of the first and second registers where data are not written, and by writing the divisor into the third register through the second bus.

In the microcomputer of the present invention, the content of the first register is given to the ALU through the first bus, and the content of the third register through the second bus for subtraction to obtain the quotient converted into the twos complement, and the content of the second register is given to the ALU through the first bus and the content of the fourth register through the second bus for subtraction to obtain the remainder converted into the twos complement.

The above and further objects and features of the invention will more fully be apparent from the following detailed description with accompanying drawings.

BRIEF DESCRIPTION OF THE DRAWINGS

FIG. 3 is a schematic view showing a configuration for subtracting a number by RSD representation and a number by twos complement representation;

FIG. 4(a) is a schematic diagram showing a table used for deciding a quotient digit, when a divisor D is positive, by a conventional division principle;

FIG. 4(b) is a schematic diagram showing a table used for deciding a quotient digit, when divisor D is negative, by a conventional division principle, FIG. 5(a) is a schematic diagram showing a quotient digit table used in a divider of the present invention, when a divisor D is positive;

FIG. 5(b) is a schematic diagram showing a quotient digit table used in a divider of the present invention, when a divisor D is negative;

FIG. 9 is a schematic view showing a truth table of a selector and an adder of a divider of the present invention;

FIG. 10 is a schematic view showing a truth table of a selector and an adder of a divider of the present invention;

FIG. 23 is a block diagram showing an example of connection for outputting the results of division by a divider of the present invention to a microcomputer.

DESCRIPTION OF THE PREFERRED EMBODIMENTS

In the following, the present invention is particularly described based on the drawings showing its embodiments.

A divider of the present invention uses a number by RSD representation as a dividend or partial remainder, and a number by twos complement representation as a divisor.

FIG. 5(a) and FIG. 5(b) are schematic diagrams showing quotient digit tables respectively used in the divider of the present invention when a divisor D is positive and negative. The divisor of the present invention decides the quotient digit according to these tables, which are far simpler than the quotient digit tables shown in FIG. 4(a) and FIG. 4(b) and used in a conventional divider.

The tables are made for referring serial 3-digit numbers "$X_2$, $X_1$, $X_0$" at a specific position in a partial remainder $R_{j+1}$ obtained by the result of operation of the "j"th time and a next quotient digit $q_{j+1}$.

In the quotient digit tables shown in FIG. 5(a) and FIG. 5(b), x indicates not to be referred and $q_j$ shows the quotient digit of the "j"th time.

The serial 3-digit numbers at a specific position in the partial remainder $R_{j+1}$ referred to are 3-digit numbers in the partial remainder $R_{j+1}$ whose leading digit corresponds to a last digit of serial "0" or "1" when viewing the divisor D from a high order.

Schematic diagrams of FIG. 6(a), FIG. 6(b) and FIG. 6(c) show operations corresponding to three values adoptable by the quotient digit $q_j$.

Figure 1:
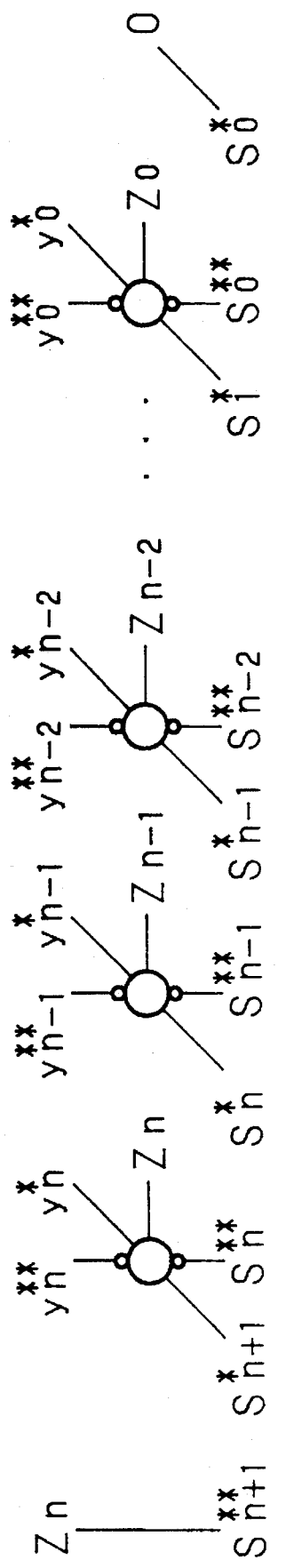
FIG. 1 is a schematic diagram showing a configuration for adding a number by RSD representation and a number by twos complement representation.

In FIG. 6(a), FIG. 6(b) and FIG. 6(c), in the same way as in the aforementioned conventional FIG. 1 and FIG. 3, a symbol of large ○ indicates a full adder and a symbol of small ○ indicates inverted inputs to, and inverted outputs from the full adder.

Figure 2:
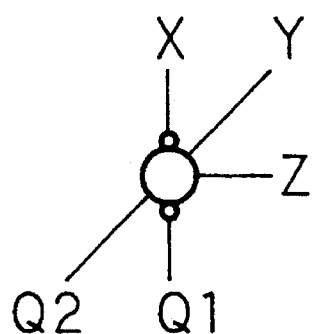
FIG. 2(a) is a schematic diagram showing inputs and outputs of full adders shown in FIG. 1.
FIG. 2(b) is a truth table therebetween.

A truth table of the full adders shown in FIGS. 6(a), FIG. 6(b) and FIG. 6(c) is same as the conventional truth table shown in FIG. 2(b), FIG. 6(a) corresponds to the case of "$q_j$=1", and shows a subtraction between the partial remainder $R_j$ and the divisor D.

FIG. 6(b) corresponds to the case of "$q_j=-1$", and shows an addition between the partial remainder $R_j$ and the divisor D.

FIG. 6(c) corresponds to the case of "$q_j=0$", and shows an addition between the partial remainder $R_j$ and the number "0".

Figure 7:
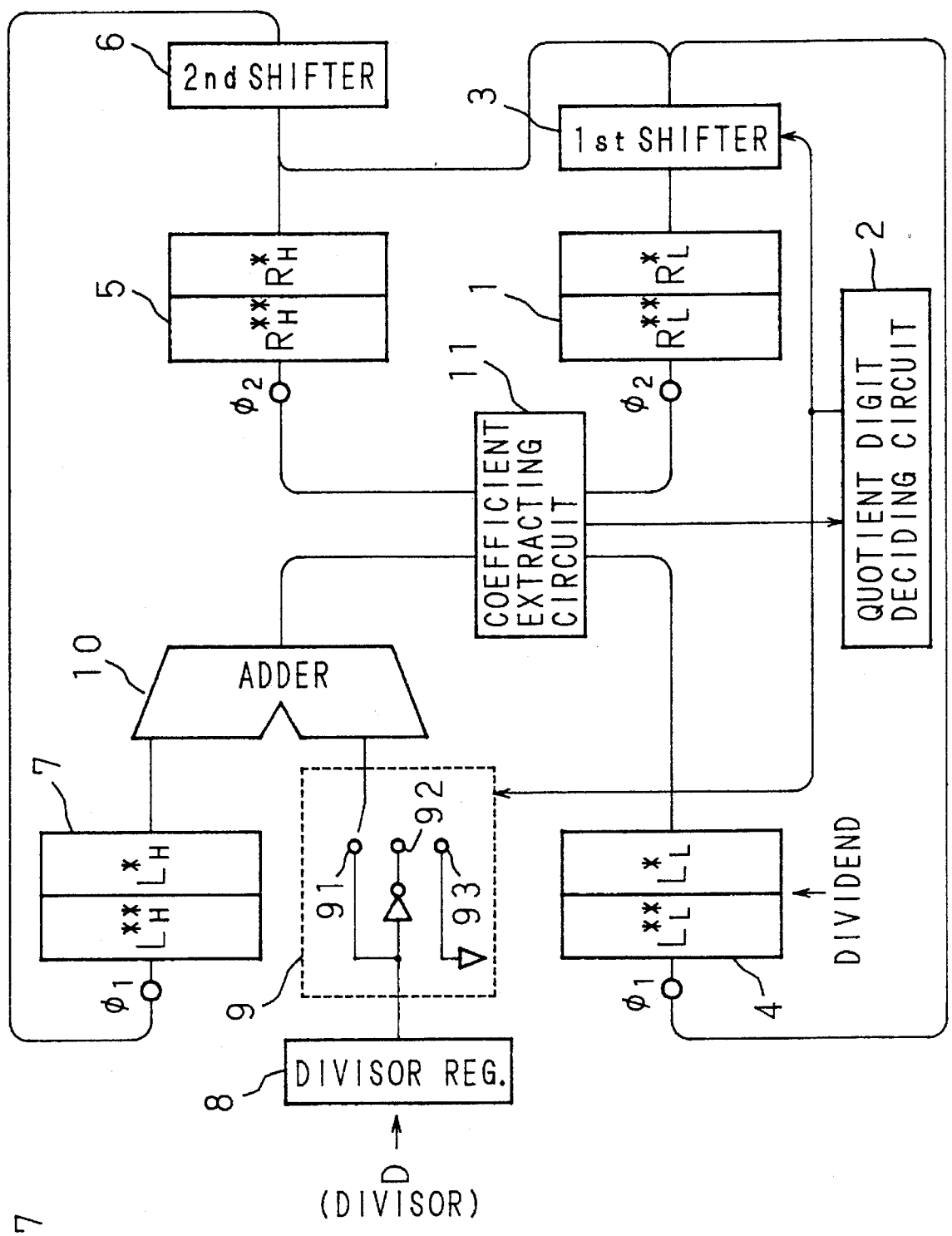
FIG. 7 is a block diagram showing a configuration of one embodiment of divider of the present invention.

FIG. 7 is a block diagram showing a configuration of one embodiment of a divider of the present invention.

The divider of the embodiment shown in FIG. 7 performs mutual division of 32 bits In FIG. 7, numeral 1 designates a first register (hereinafter, referred to as a first register pair), which is constituted in a pair by the two registers storing a dividend or a portion of quotient. To the first register pair 1, an output of a coefficient extracting circuit 11 to be described later is inputted in synchronism with a second control signal $\phi_2$, and its output is given to a first shifter 3 to be described later.

Numeral 2 designates a quotients digit deciding circuit as quotient digit deciding means. The output of the coefficient extracting circuit 11 to be described later is inputted to the quotient digit deciding circuit 2, and its output is given to the first shifter 3 and a selector 9 to be described later.

The output of the first register pair 1 and the output of the quotient digit deciding circuit 2 are inputted to the first shifter 3, and its output is given to the shifter 6 and a first latch pair 4 to be described later.

Numeral 4 designates a pair of 32-bit first latch (hereinafter, referred to as a first latch pair), which inputs the output of the above-mentioned first shifter 3 in synchronism with a first control signal $\phi_1$, and holds it temporarily and outputs it to the coefficient extracting circuit 11.

Numeral 8 designates a pair of 32-bit second register (hereinafter, referred to as a second register pair). The output of the coefficient extracting circuit 11 is given in synchronism with the second control signal $\phi_2$ to the second register pair 5, and its output is given to the second shifter 0.

Numeral 6 designates the second shifter, to which an output of the second register pair 8 and the output of the first shifter 3 are inputted as aforementioned, and its output is given to a second latch pair to be described later.

Numeral 7 designates a second latch (hereinafter, referred to as the second latch pair), which is a pair of 32-bit latches and inputs the output of the second shifter 6 in synchronism with the first control signal $\phi_1$, holds it temporarily and outputs it to an input terminal of an adder 10.

Numeral 8 designates a 32-bit divisor register storing a divisor D. The divisor register 8 holds the divisor D given from outside and outputs it to a selector 9 to be described later.

Numeral 9 designates the selector, whose function is shown in FIG. 7 in a symbolized fashion. The selector 9 inputs the divisor D held by the divisor register 8, and respectively outputs the divisor D intact from a terminal 91, an inverted value of the divisor D from a terminal 92 and "0" from a terminal 93. Responding to the quotient digit given from the quotient digit deciding circuit 2, the selector 9 selects and outputs any of the terminals 91, 92 and 93, specifically, any of the intact divisor value, the inverted value of the divisor and "0" to a second input terminal of the adder 10.

The adder 10 inputs the output of the second latch pair 7, which is the number by RSD representation to a first input terminal and inputs the output of the selector 9, which is a number by,twos complement representation, to a second input terminal for addition. The result of addition by the adder 10 is outputted to the coefficient extracting means 11.

Numeral 11 designates the coefficient extracting circuit as the coefficient extracting means, which extracts the aforementioned serial 3-digit numbers at a specific position in the partial remainder $R_{j+1}$, as a coefficient, from the outputs of the adder 10 and the first latch pair 4.

Figure 8:
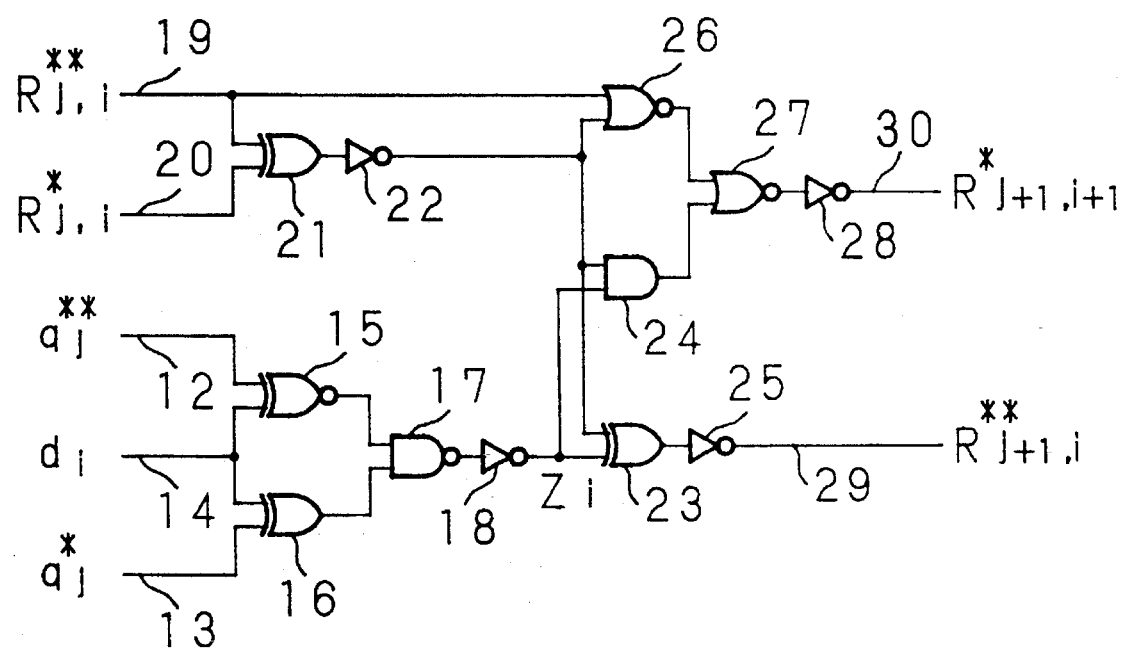
FIG. 8 is a circuit diagram showing a detailed configuration of a selector and an adder of a divider of the present invention together with each other.

FIG. 8 is a circuit diagram showing a detailed configuration of the selector 9 and the adder 10 together with each other.

In FIG. 8, however, the configuration for one bit is shown, thus the selector 9 and the adder 10 are constituted by arranging this configuration in parallel for 32 bits.

The quotient digit $q_j$ is expressed by the following expression.

$$q_j = q_j^* - q_j^{};\ q_j^{}, q_j^* \in \{0, 1\}$$

In FIG. 8, numeral 12 designates an input terminal of the quotient digit $q_j^{**}$, and numeral 13 designates an input terminal of the quotient digit $q_j^*$. Numeral 14 designates a 1-bit input terminal of the divisor D, numeral 15 designates an exclusive NOR gate and numeral 16 designates an exclusive OR gate.

The input terminal 12 is connected to one input of the exclusive NOR gate 15, and the input terminal 14 is connected to another input thereof, and its output is given to one input of a NAND gate 17. The input terminal 13 is connected to one input of the exclusive OR gate 16, and the input terminal 14 is connected to another input thereof, and its output is given to another input of the NAND gate 17. An output of the NAND gate 17 is inputted to an inverter 18, whose output is given to an exclusive OR gate 23 and an AND gate 24 to be described later.

By the numerals 15, 16, 17 and 18, an "i"th bit of the selector 9 is constituted.

Upper 32 bits in the partial remainder or dividend $R_j$ are always inputted to the adder 10. The upper 32 bits inputted to the adder 10 are designated by $R_{j,i}$ and expressed by the following expression.

$$R_{j,i} = R_{j,i}^* - R_{j,i}^{};\ R_{j,i}^{}, R_{j,i}^* \in \{0, 1\}$$

In FIG. 8,i numerals 19 and 20 designate input terminals, into which $R_{j,i}^{**}$ and $R_{j,i}^*$ are inputted respectively from the second hatch pair 7.

Numeral 21 designates an exclusive OR gate, to one input of which the input terminal 19 is connected, and to another input thereof, the input terminal 20 is connected, and its output is given to a NOR gate 23, AND gate 24 and NOR gate 26 via an inverter 22.

To one inputs of the exclusive OR gate 23, AND gate 24 and NOR gate 26, the output of the inverter 18 is connected, and to the other inputs thereof, the output of the inverter is connected.

Numeral 25 designates an inverter, which inputs the output of the exclusive OR gate 23 and outputs $R_{j+1,i}^{}$. That is, the output of the inverter 25 serves as an output terminal 29 of the $R_{j+1,i}^{}$. The input terminal 19 is connected to one input of the NOR gate 26, and the output of the inverter 22 is given to another input thereof as mentioned before. An output of the NOR gate 26 is given to one input of a NOR gates 27.

To another input of the NOR gate 27, an output of the AND gate 24 is given, and its output is given to an inverter 28.

The inverter 28 inputs the output of the NOR gate 27 and outputs $R_{j+1,i+1}^*$. That is, th output of the inverter 28 serves as the output terminal 30 of the $R_{j+1,i}^{**}$.

By the numerals 21 to 28, an i bit of the adder 10 is constituted.

The "i"th bit of the adder 10 provides the $R_{j+1, i}{**}$ and $R_{j+1, i+1}{*}$ in, $$R_{j+1, i}=R_{j+1, i}{*}-R_{j+1, i}{**}, \text{ and}$$

$$R_{j+1, i+1}=R_{j+1, i+1}{*}-R_{j+1, i+1}{**}.$$

FIG. 9 ant FIG. 10 are schematic views showing truth tables of the selector 9 and the adder 10.

The truth table of FIG. 9 shows output values of a node Z in FIG. 8 fop respective input values of the divisor $d_i$ and quotient digits $q_j{*}$, $q_j{**}$.

The truth table of FIG. 10 shows output values of the $R_{j+1, i}{**}$, $R_{j+1}{*}$ for respective input values of a node $Z_i$ and dividends $R_{j, i}{**}$, $R_{j, i}{*}$.

Figure 11:
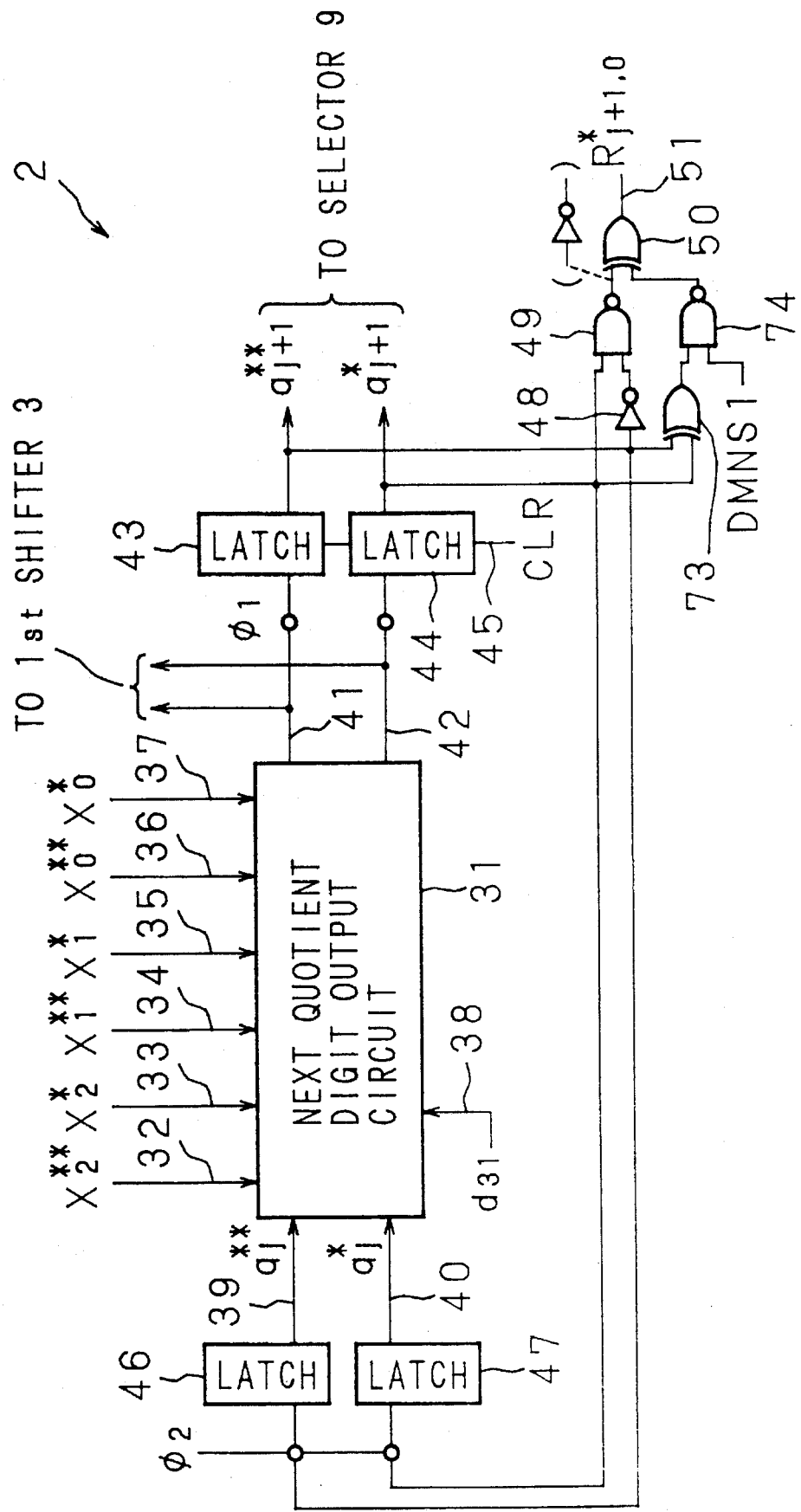
FIG. 11 is a circuit diagram showing a configuration of a quotient digit deciding circuit of a divider of the present invention.

FIG. 11 is a circuit diagram showing a configuration of the quotient digit deciding circuit 2.

In FIG. 11, numeral 31 designates a next quotient digit output circuit, which inputs serial 3-digit numbers "$X_2, X_1, X_0$" at a specific position in the partial remainder $R_{j+1}$ and a signed bit $d_{31}$ and the quotient digit $q_j$ of the divisor D, and outputs a next quotient digit $q_{j+1}$.

$X_2, X_1, X_0$ are expressed as follows, $$X_2=X_2{*}-X_2{**}$$

$$X_1=X_1{*}-X_1{**}$$

$$X_0=X_0{*}-X_0{**}$$

Numerals 32 to 37 designate input terminals of the next quotient digit output circuit 31 for inputting $X_2{**}$, $X_2{*}$, $X_1{**}$, $X_1{*}$, $X_0{**}$, $X_0{*}$.

Numeral 38 designates an input terminal of the next quotient digit output circuit 31 of the signed bit $d_{31}$.

Hereupon, the quotient digit $q_j$ is expressed by the following expression.

$$q_j=q_j{*}-q_j{**}$$

Numerals 39 and 40 designate input terminals of the next quotient digit output circuit 31 for inputting $q_j{*}$, $q_j{**}$ in the above-mentioned expression.

The next quotient digit $q_{j+1}$ is expressed by the following expression.

$$q_{j+1}=q_{j+1}{*}-q_{j+1}{**}$$

Numerals 41 and 42 designate output terminals of the next quotient digit output circuit 31 for outputting $q_{j+1}{**}$, $q_{j+1}{*}$.

The output from the output terminals 41, 42 are given to the first shifter 3, and respectively to latches 43, 44.

The outputs of the latches 43, 44 are given to the selector 9.

Numeral 45 designates a control terminal for initializing the latches 43, 44 to "0".

Numerals 46 and 47 designate latches, respective input terminals of which are connected to the outputs of the latches 43, 44. The outputs of the latches 46, 47 serve as the input terminals 39, 40.

Numeral 48 designates an inverter, which inverts the output of the latch 43 and gives it to one input of a NAND gate 49.

To another input of the NAND gate 49, the output of the latch 44 is given, and its output is given to one input of an exclusive OR gate 50.

Numeral 73 designates an exclusive OR gate, to inputs of which the outputs of the latches 43, 44 are given. An output of the exclusive OR gate 73 is given to one input of a NAND gate 74.

To another input of the NAND gate 74, a signal DMNS1 is given, and its output is given to another input of the exclusive OR gate 50.

Figure 6:
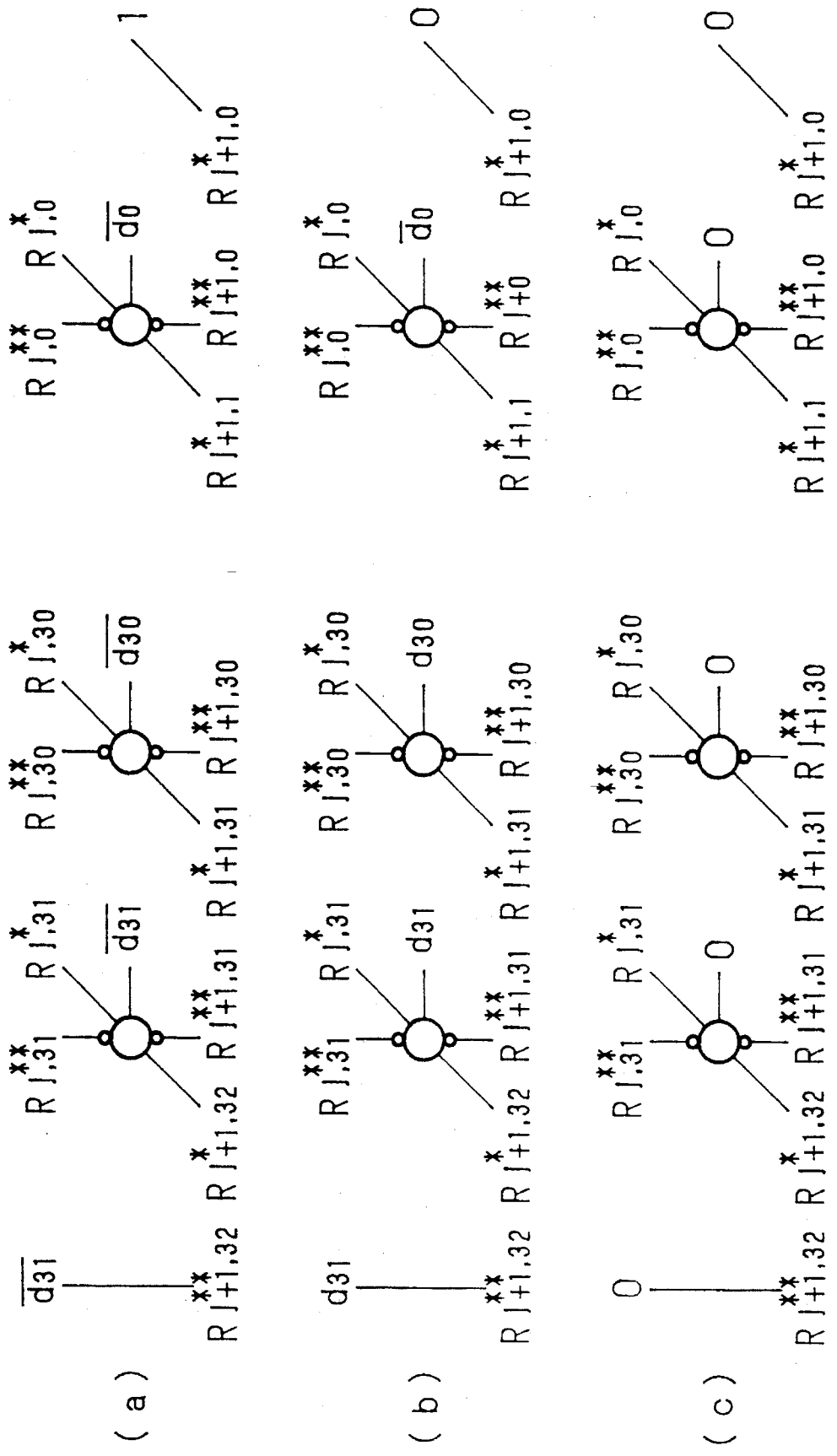
FIG. 6(a) is a schematic diagram showing operations corresponding to the case where a quotient digit $q_j$ is "1"
FIG. 6(b) is a schematic diagram showing operations corresponding to the case where a quotient digit $q_j$ is "–1"
FIG. 6(c) is a schematic diagram showing operations corresponding to the case where a quotient digit $q_j$ is "0"

The output of the exclusive OR gate 50 serves as an output terminal 51 for outputting $R_{j+1, 0}{*}$, which gives the $R_{j+1, 0}{*}$ in FIG. 6 (treated in the same way as the output of the adder 10).

The signal DMNS1 inputted to the NAND gate 74 is a signal which becomes "1" when the divisor value is "−1", and it may be substituted by the inverter when there is no possibility that the divisor value is "−1". In that case, the exclusive OR gate 73 as well as the NAND gate 74 are not necessary.

Figure 12:
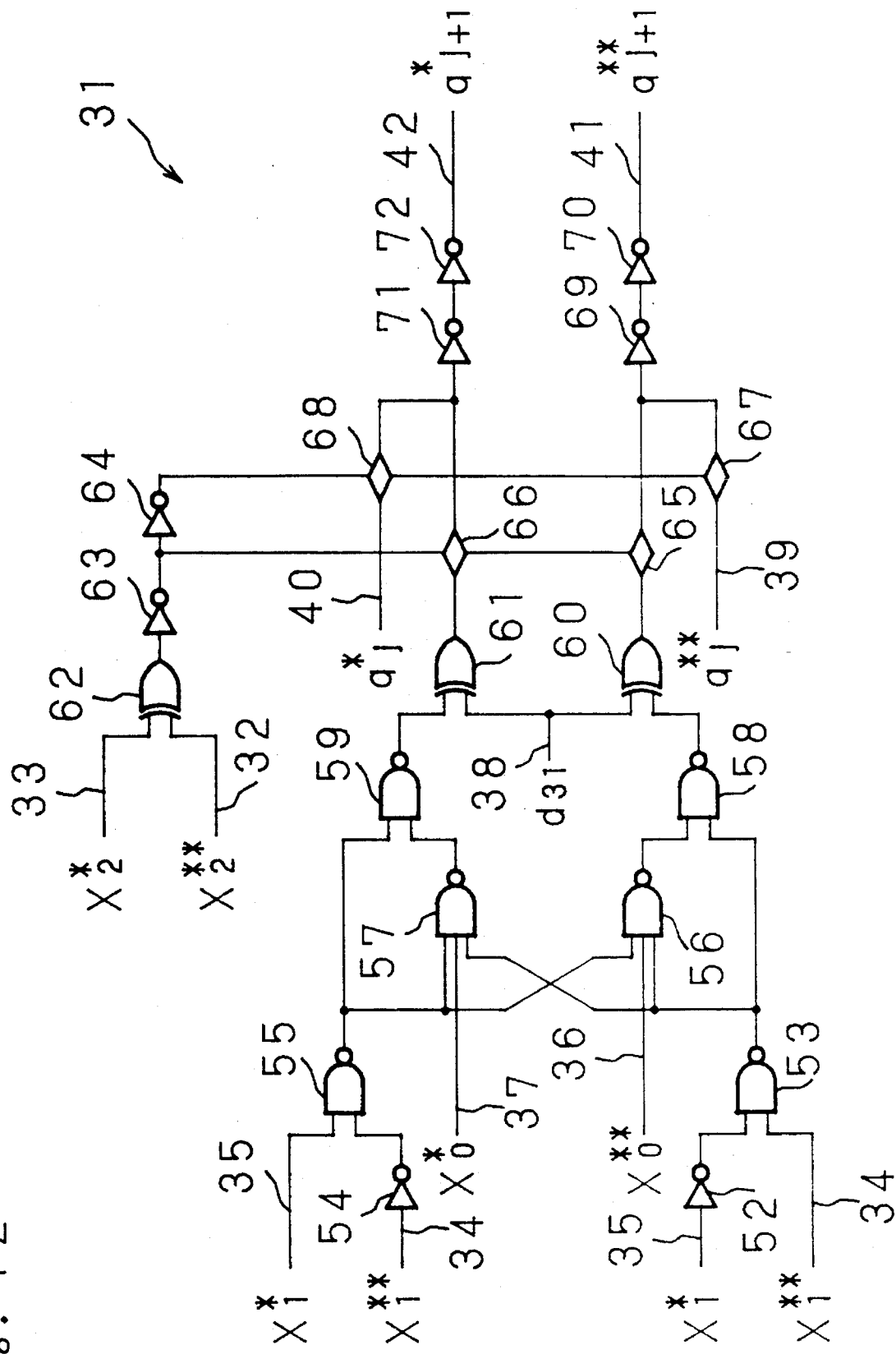
FIG. 12 is a circuit, diagram showing a detailed configuration of a next quotient digit output circuit of a quotient digit deciding circuit of a divider of the present invention.

FIG. 12 is a circuit diagram showing a detailed configuration of the above-mentioned next quotient digit output circuit 31.

In FIG. 12, numerals 32 to 37 designate input terminals for inputting $X_2{**}$, $X_2{*}$, $X_1{**}$, $X_1{*}$, $X_0{**}$, $X_0{*}$.

Numeral 38 designates an input terminal of bit 31 ($d_{31}$) of the divisor D.

Numerals 39, 40 designate input terminals of $q_j{**}$ and $q_j{*}$, and numerals 41, 42 designate output terminals of $q_{j+1}{**}$, and $q_{j+1}{*}$.

Numeral 53 designates a NAND gate, one input out which is connected to the input terminal 34 and another input thereof is connected to the input terminal 35 via an inverter 52.

Numeral 55 designates a NAND gate, one input of which is connected to the input terminal 35, and another input thereof is connected to the input terminal 34 via an inverter 54.

Numeral 56 designates a 3-input NAND gate, a first input of which is connected to the terminal 36, a second input is connected to the output of the NAND gate 53, and a third input is connected to the output of the NAND gate 55.

Numeral 57 designates a 3-input NAND gate, a first input of which is connected to the input terminal 37, a second input is connected to the output of the NAND gate 53 and a third input is connected to the NAND gate 55.

Numeral 58 designates a NAND gate, one input of which is connected tot he output of th NAND gate 53, and another input is connected to the output of the NAND gate 56.

Numeral 59 designates a NAND gate, one input of which is connected to the output of the NAND gate 55, and another input is connected to the output of the NAND gate 57.

Numeral 60 designates an exclusive OR gate, one input of which is connected to the input terminal 38, and another input is connected to the output of the NAND gate 58.

Numeral 61 designates an exclusive OR gate, one input of which is connected to the input terminal 38, and another input is connected to the output of the NAND gate 59.

Numeral 62 designates an exclusive OR gate, one input of which is connected to the input terminal 32, and another input is connected to the input terminal 33. An output of the exclusive OR gate 62 is given to transfer gates 66 and 65 via an inverter 63, and further, given to transfer gates 68 and 67 via an inverter 64.

Both of the transfer gates 65, 66 are conducted when an output of the inverter 63 is "1", and both of the transfer gates 67, 68 are conducted when an output of the inverter 64 is "1".

An input of the transfer gate 65 is connected to the output of the exclusive OR gate 60, and its output serves as the output terminal 41 via inverters 69, 70.

An input of the transfer gate 66 is connected to the output of the exclusive OR gate 61, and its output serves as the output terminal 42 via inverters 71, 72.

An input of the transfer gate 67 is connected to the input terminal 39, and its output serves as the output terminal 41 via the above-mentioned inverters 69, 70.

An input of the transfer gate 68 is connected to the input terminal 40, and its output serves as the output terminal 42 via the above-mentioned inverters 71, 72.

Next, the operation of the divider of the present invention is described with reference to a timing chart of FIG. 13.

In this embodiment, it is assumed that the divisor is not to take a value "−1".

Figure 13:
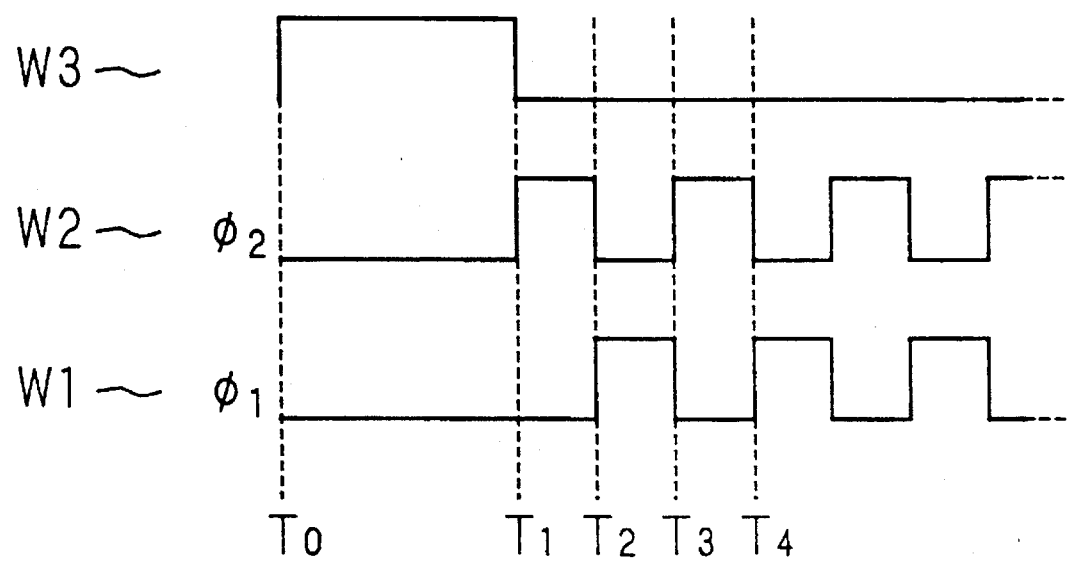
FIG. 13 is a timing chart for explaining the operation of a divider of the present invention.

In FIG. 13, W1 indicates a waveform of the first control signal $\phi_1$, W2 indicates a waveform of the second control signal $\phi_2$ and W3 indicates a waveform of a timing for sending a dividend and a divisor to the divider.

At the time $T_0$, the dividend is written into the first latch pair 4, and the divisor is written into the divisor register 8.

At this timing, "0" is written into the second latch pair 7, and the latches 43, 44 are cleared to "0".

Till the time $T_2$, "0" is inputted to the adder 10 as $q_{-1}$, $q_{-1}{}^*$, and since $R_{-1,0}{}^{}$ is "0", the output of the adder 10** during this period becomes as follows.

$$R_{0,31}{}^{**}=R_{0,31}{}^*=\ldots=R_{0,1}{}^{**}=R_{0,1}{}^*=R_{0,0}{}^{**}=0$$

Till the time $T_1$, the coefficient extracting circuit 11 extracts $X_2, X_1, X_0$, and sends them to the quotient digit deciding circuit 2. Receiving them, the next quotient digit output circuit 31 of the quotient digit deciding circuit 2 decides the quotient digits $q_0{}^{**}$ and $q_0{}^*$ till the time $T_2$, according to the table shown in FIG. 9 or FIG. 10.

At the time $T_1$, the content of the first latch pair 4 adder 10 is sent to the second latch pair 7.

At the time $T_2$, lower 31 bits of the content of the first latch pair 4 and the quotient digit $q_0$ decided previously are sent to the first latch pair 4 via the first shifter 3. Simultaneously, lower 31 bits of the content of the second register pair 5 and an upper 1 bit of the first shifter 3 are sent to the second latch pair 7 via the second shifter 6.

At the time $T_2$, the quotient digits $q_0{}^{**}$ and $q_0{}^*$ are sent to the latches 43, 44 and held therein until the time $T_4$. The selector 9 is controlled by the outputs of the latches 43, 44, and further, $R_{1,0}{}^*$ is composed.

In the adder 10, the output of the second latch pair 7 and the output of the selector 9 are added to output $R_{1,31}{}^{**}, R_{1,31}{}^*, \ldots R_{1,1}{}^{**}, R_{1,1}{}^*, R_{1,0}{}^{**}$.

The coefficient extracting circuit 11 extracts $X_2, X_1, X_0$ and sends them to the quotient digit deciding circuit 2 till the time $T_3$.

Receiving them, the next quotient digit output circuit 31 of the quotient digit deciding circuit 2 decides the quotient digits $q_1{}^{**}$ and $q_1{}^*$ according to the table shown in FIG. 9 or FIG. 10 till the time $T_4$.

A first cycle of the division is from the time $T_2$ to time $T_4$ among the above-mentioned times. Therefore, the same cycle is repeated 31 times to complete the division. In such a manner, at the time point of the completion of division, the quotient is stored in the first latch pair 4 and the remainder is stored in the second latch pair 7.

FIG. 14 and FIG. 15, FIG. 19 and FIG. 20, FIG. 16, FIG. 17 and FIG. 18 are circuit diagrams showing a configuration of the coefficient extracting circuit 11.

Figure 14:
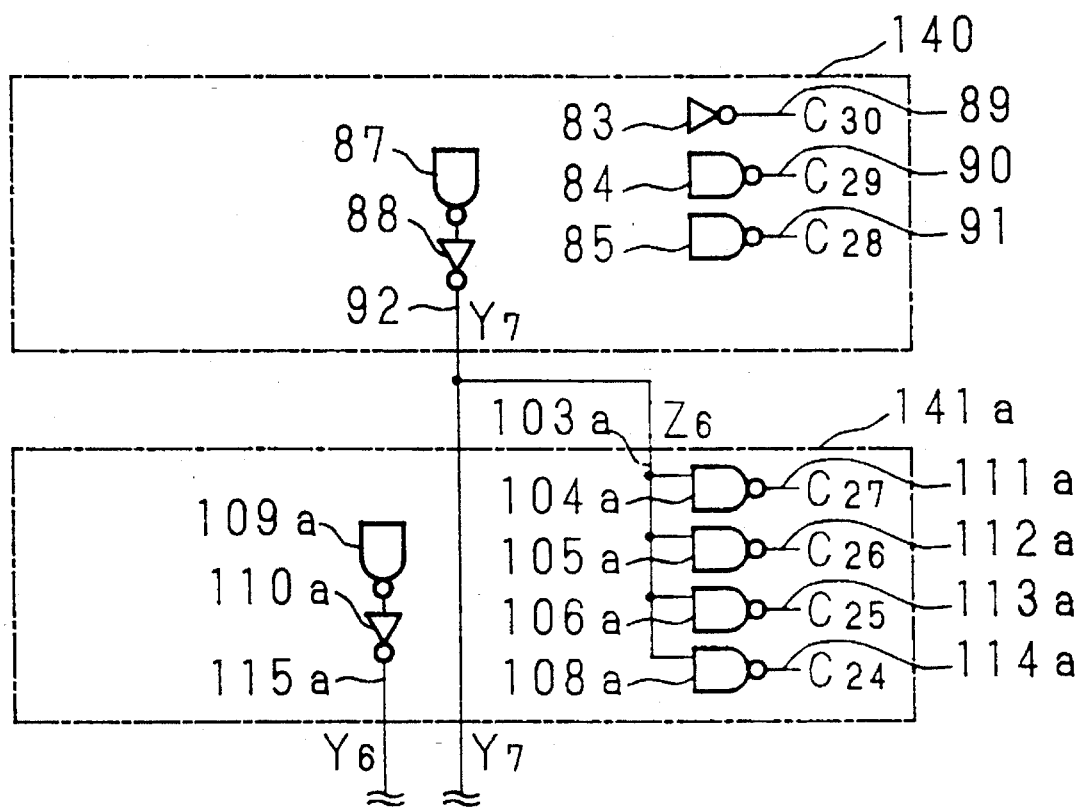
FIG. 14 is a circuit diagram showing, together with FIG. 15, a circuit configuration of a portion having a function for deciding positions of $X_2$, $X_1$, $X_0$ from a value of divisor D of a coefficient extracting circuit of a divider of the present invention.
Figure 15:
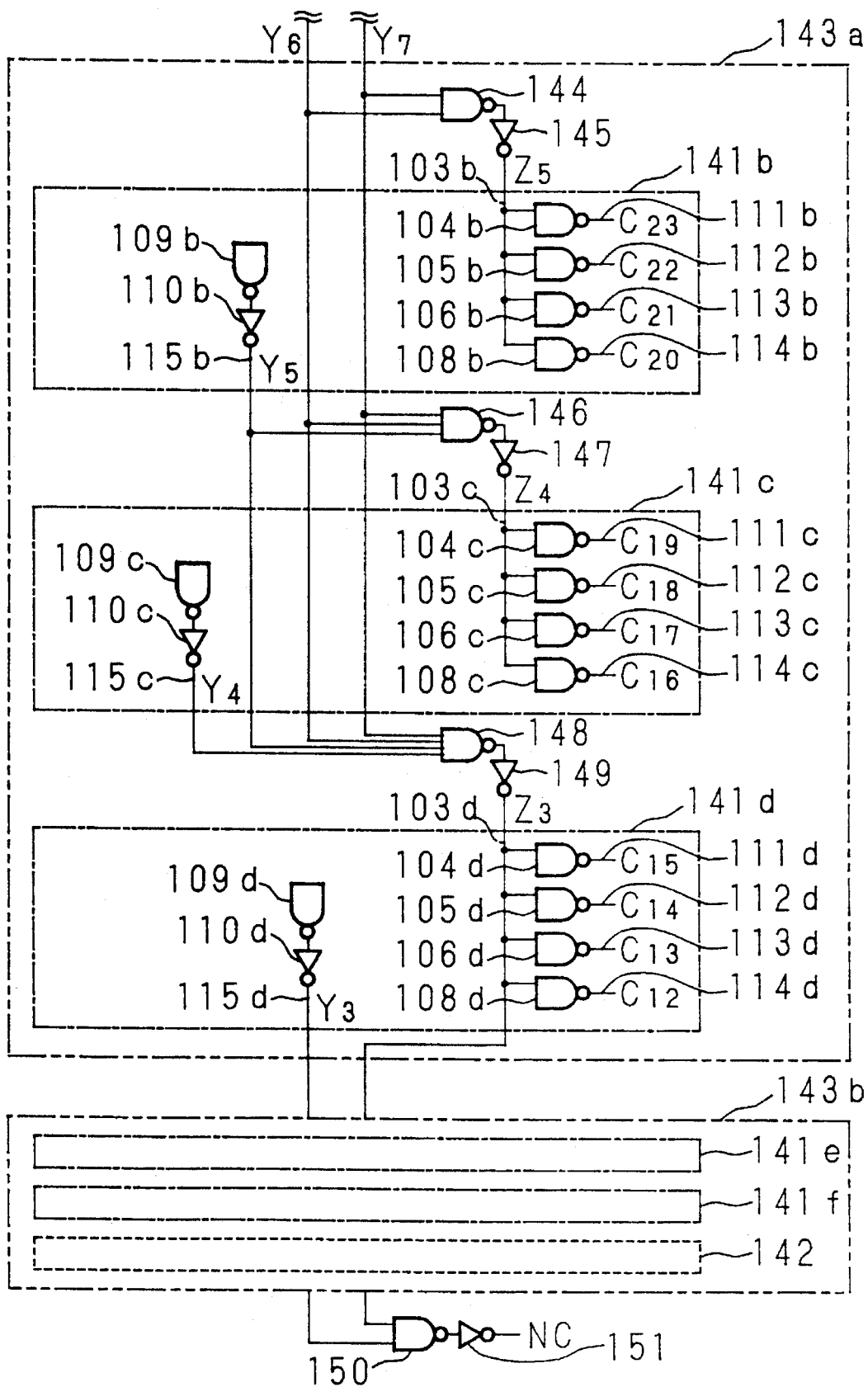
FIG. 15 is a circuit diagram showing, together with FIG. 14, a circuit configuration of a portion having a function for deciding positions of $X_2$, $X_1$, $X_0$ from a value of divisor D of a coefficients extracting circuit of a divider of the present invention.
Figure 19:
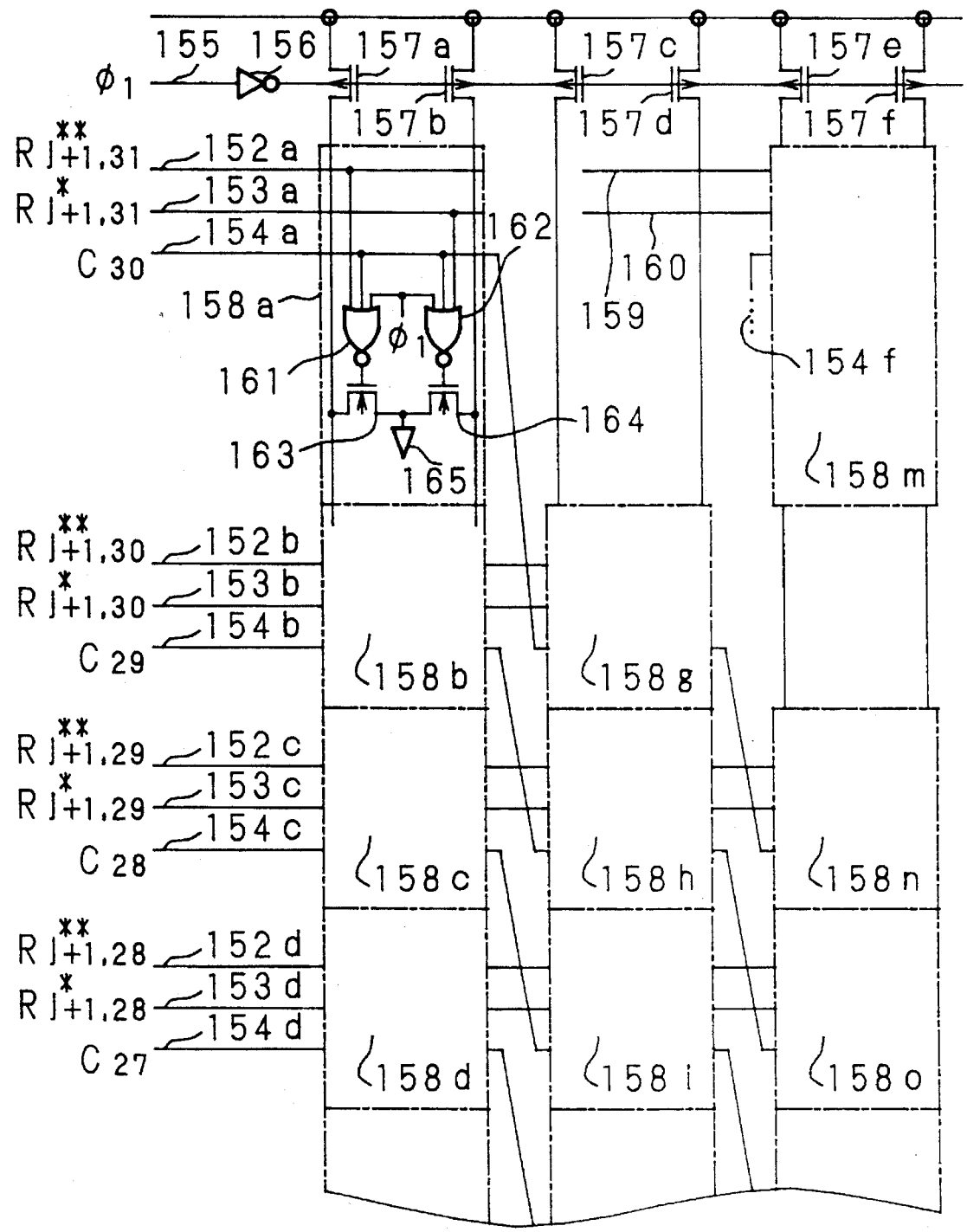
FIG. 19 is a circuit diagram showing, together with FIG. 20, an example of a detailed configuration of constituents of a coefficient extracting circuit of a divider of the present invention.
Figure 20:
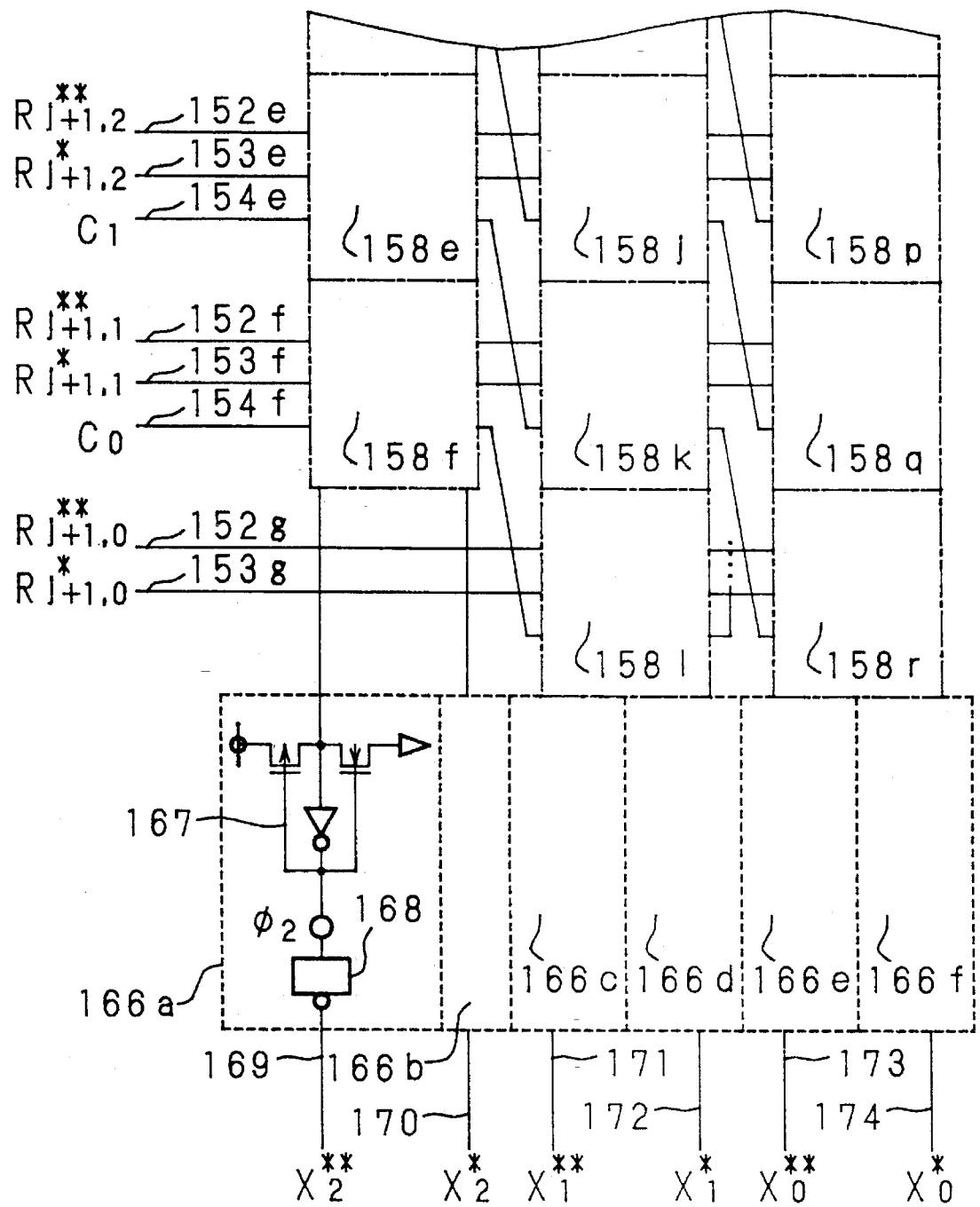
FIG. 20 is a circuit diagram showing, together with FIG. 19, an example of a detailed configuration of constituents of a coefficient extracting circuit of a divider of the present invention.

FIG. 14 and FIG. 15 respectively show divided diagrams which are originally one diagram, and FIG. 19 and FIG. 20 respectively show divided diagrams which are originally one-diagram, too.

FIG. 14 and FIG. 15 show a circuit configuration of a portion having a function to decide positions of $X_2, X_1, x_0$ from the value of the divisor D.

Figure 16:
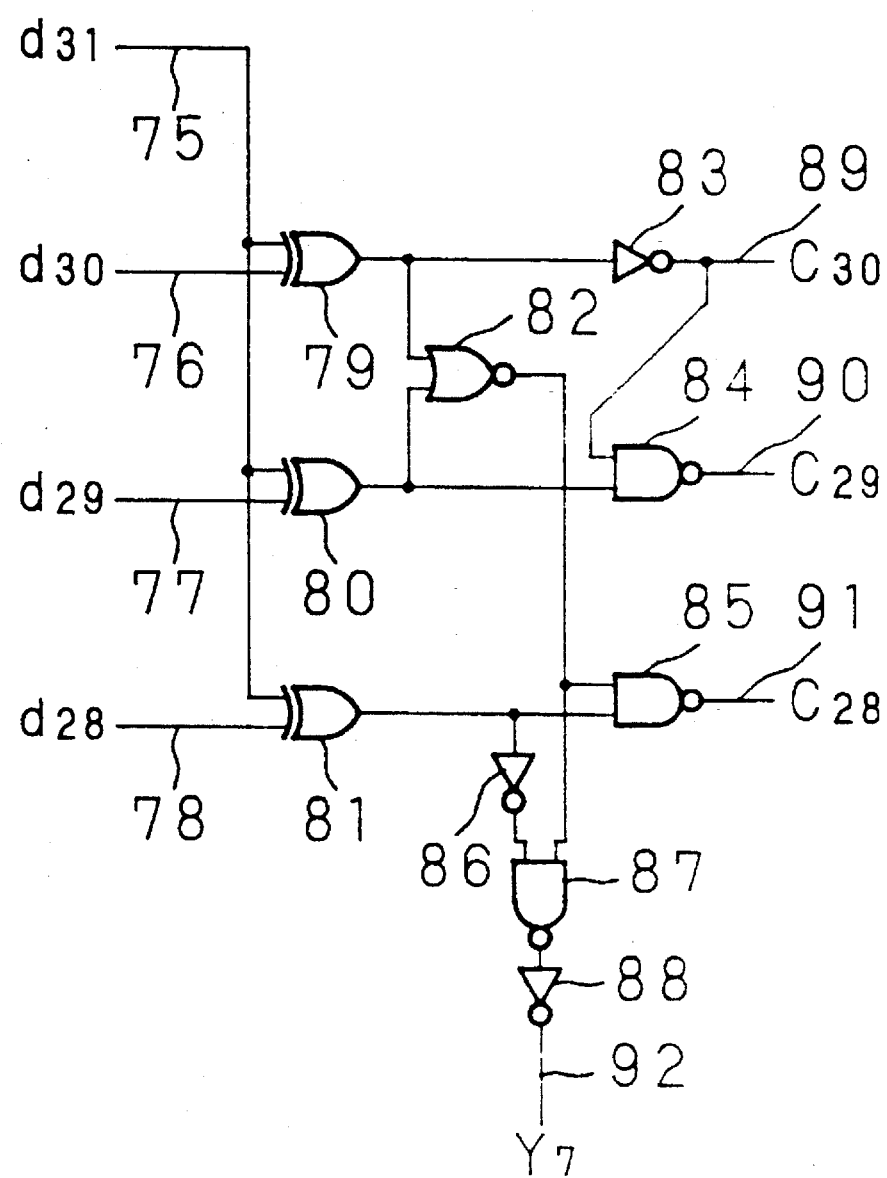
FIG. 16 is a circuit diagram showing an example of a detailed configuration of constituents of a coefficient extracting circuit of a divider of the present invention.
Figure 17:
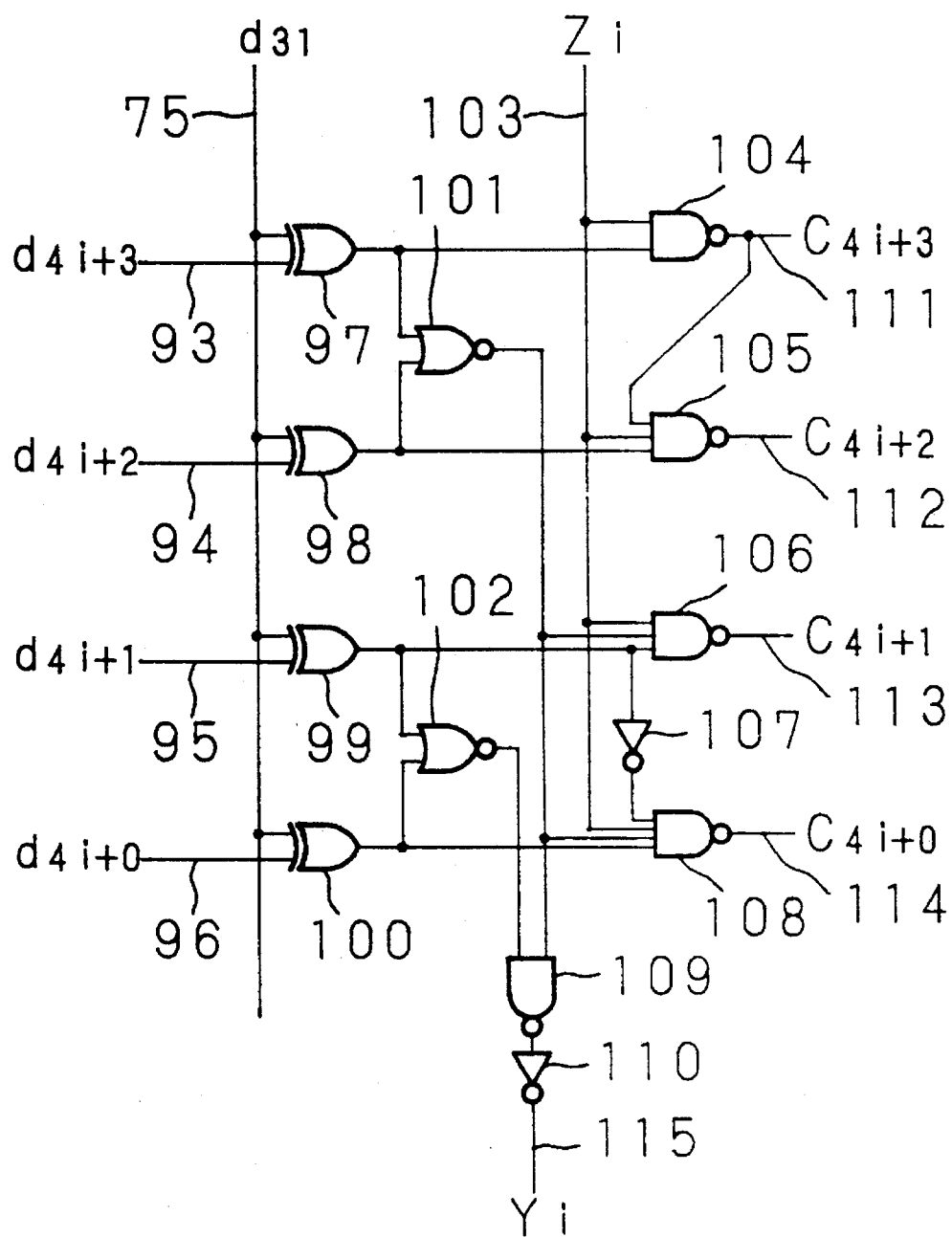
FIG. 17 is a circuit diagram showing an example of a detailed configuration of constituents of a coefficient extracting circuit of a divider of the present invention.
Figure 18:
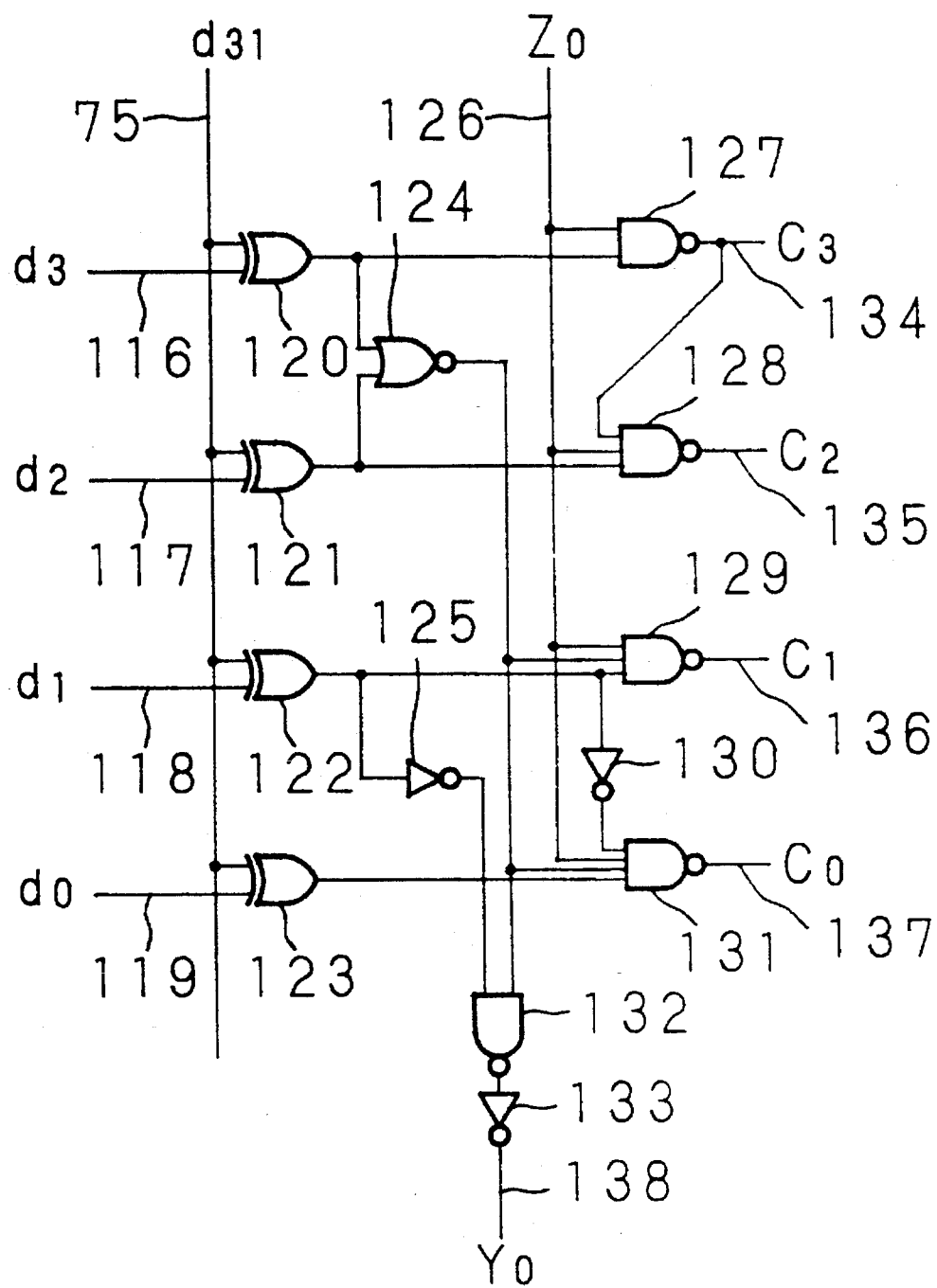
FIG. 18 is a circuit diagram showing an example of a detailed configuration of constituents of a coefficient extracting circuit of a divider of the present invention.

FIG. 16, FIG. 17 and FIG. 18 are the detailed circuit diagrams of constituents of the coefficient extracting circuit 11 shown in FIG. 14 and FIG. 15.

FIG. 16 shows a configuration of a block designated by reference numeral 140 shown in FIG. 14 and FIG. 15.

In FIG. 16, numerals 75 to 78 designate input terminals of bit 31 to bit 28 ($d_{31}$ to $d_{28}$) of the divisor D.

Numerals 79, 80, 81 respectively designate exclusive OR gates.

One input of the exclusive OR gate 79 is connected to the input terminal 75, and another input terminal is connected to the input terminal 76, and its output is given to one input of a NOR gate 82 and an inverter 83. One input of the exclusive OR gate 80 is connected to the input terminal 75, and another input is connected to the input terminal 77, and its output is given to another input of the NOR gate 82 and a NAND gate 84. One input of the exclusive OR gate 81 is connected to the input terminal 75, and another input is connected to the input terminal 78, and its output is given to a NAND gate 85 and an inverter 86.

An output of the NOR gate 82 is given to one input of the NAND gate 85 a d one input of a NAND gate 87. To another input of the NAND gate 85, the output of the exclusive OR gate 81 is given as aforementioned, and its output serves as an output terminal 91 of a signal $C_{28}$. To another input of a NAND gate 87, the output of the exclusive OR gate 81 is given via the inverter 86, and its output serves as an output terminal 92 of a signal $Y_7$ via an inverter 88.

An output of the inverter 83 is given to one input of the NAND gate 84, and serves as an output terminal 89 of a signal $C_{30}$. To another input of the NAND gate 84, the output of the exclusive OR gate 80 is given as mentioned before, and its output serves as an output terminal 90 of a signal $C_{29}$.

Thus, in the circuit shown in FIG. 16, bits 31, 30, 29, 28 ($d_{31}, d_{30}, d_{29}, d_{28}$) of the divisor D are inputted from the input terminals 75, 76, 77, 78, and the signals $C_{30}, C_{29}, C_{28}$ and $Y_7$ are outputted from the output terminals 890, 90, 91 and 92.

FIG. 17 shows a configuration of blocks designated by reference numerals 141a to 141f shown in FIG. 14 and FIG. 15.

In FIG. 17, numeral 75 designates an input terminal of the bit 31 ($d_{31}$) of the divisor D.

Numerals 93 to 96 designate input terminals of bits 4i+3 to 4i+0($d_{4i+3}, d_{4i+2}, d_{4i+1}, d_{4i+0}$) of the divisor D.

Numerals 97, 98, 99, 100 designate exclusive OR gates, to one input terminals of which the input terminal 75 is connected.

To another input of the exclusive OR gate 97, input terminal 93 is connected, and its output is given to one input of a NAND gate 104 and one input of a NAND gate 101. To another input of the exclusive Or gate 98, the input terminal 94 is connected, and its output is given to a first input of 3-input NAND gate 105 and to another input of the OR gate 101. To another input of the exclusive OR gate 99, the input terminal 95 is connected, and its output is given to a first input of a 3-input NAND gate 106, an input of an inverter 107 and one input of a NOR gate 102. To another input of the exclusive OR gate 100, the input terminal 96 is connected, and its output is given to a first input of a 4-input NAND gate 108 and to another input of the NOR gate 102.

An output of the NOR gate 101 is given to a second input of the NAND gate 106, a second input of the NAND gate 108 and one input of a NAND gate 109. An output of the NOR gate 102 is given to another input of the NAND gate 109. An output of the NAND gate 109 serves as an output terminal 115 of a signal $Y_i$ via an inverter 110.

Numeral 103 designates an input terminal of a signal $Z_i$, and is connected to another input of the NAND gate 104, a second input of the NAND gate 105, a third input of the NAND gate 106 and a third input of the NAND gate 108.

An output of the NAND gate 104 is given to a third input of the NAND gate 105, and serves as an output terminal 111 of a signal $C_{4i+3}$. An output of the NAND gate 105 serves as an output terminal 112 of a signal $C_{4i+2}$. An output of the NAND gate 106 serves as an output terminal 113 of a signal $C_{4i+1}$. To fourth input of the NAND gate 108, an output of the exclusive OR gate 99 is given via the aforementioned inverter 107, and its output serves as an input terminal 114 of a signal $C_{4i+0}$.

This, in the circuit shown in FIG. 17, the bits 31, 4i+3, 4i+2, 4i+1, 4i+0 ($d_{31}$, $3_{4i+3}$, $d_{4i+2}$, $d_{4i+1}$, $d_{4i+0}$) of the divisor D are inputted from the input terminals 75, 93, 94, 95, 96, and the signals $C_{4i+3}$, $C_{4i+2}$, $C_{4i+1}$, $C_{4i+0}$ and a signal $Y_i$ are outputted from the output terminals 11, 112, 113, 114 and 115 respectively.

FIG. 18 shows a configuration of a block designated by reference numeral 142 shown in FIG. 14 and FIG. 15.

In FIG. 18, numeral 75 designates an input terminal of a bit 31 ($_{31}$) of the divisor D.

Numerals 116 to 119 respectively designated input terminals of bits 3 to 0 ($d_3$, $d_2$, $d_1$, $d_0$) of the divisor D.

Numerals 120, 121, 122, 123 designate exclusive OR gates, to each of one inputs of which, the input terminal 75 is connected.

To another input of the exclusive OR gate 120, the input terminal 116 is connected, and its output is given to one input of a NAND gate 127 and to one input of a NOR gate 124. To another input of the exclusive OR gate 121, the input terminal 117 is connected, and its output is given to a first input of a 3-input NAND gate 128 and another input of the NOr gate 124. To another input of the exclusive OR gate 122, the input terminal 118 is connected, and its output is given to a first input of a 3-input NAND gate 129, an input of an inverter 125 and an input of an inverter 130. To another input of the exclusive OR gate 123, the input terminal 119 is connected, and its output is given to a first input of a 4-input NAND gate 131.

An output of the NOR gate 124 is given to a second input of the NAND gate 129, a second input of the NAND gate 131 and one input of an NAND gate 132, and an output of the inverter 125 is given to anther input of the NAND gate 132. An output of the NAND gate 132 serves as an output terminal 138 of a signal $Y_0$ via an inverter 133.

Numeral 126 designates an input terminal of a signal $Z_0$, which is connected to another input of the NAND gate 127, a second input of the NAND gate 128, a third input of the NAND gate 129 and a third input of the NAND gate 131.

An output of the NANd gate 127 is given to a third input of the NAND gate 128, and serves as an output terminal 134 of a signal $C_3$. An output of the NAND gate 128 serves as an output terminal 135 of a signal $C_2$. An output of the NAND gate 129 serves as an output terminal 136 of a signal $C_1$. To a fourth input of the NAND gate 131, an output of the exclusive OR gate 122 is given via the aforementioned inverter 130, and its output serves as an output terminal 137 of a signal $C_0$.

Thus, in the circuit shown in FIG. 18, the bits 31, 3, 2, 1, 0 ($d_{31}$, $d_3$, $d_2$, $d_1$, $d_0$) of the divisor D are inputted from the input terminals 75, 116, 117, 118, 119, and the signals $C_3$, $C_2$, $C_1$, $C_0$ and the signal $Y_0$ are outputted from the output terminals 134, 135, 136, 137 and 138.

In FIG. 14 and FIG. 15, numeral 140 designates the circuit shown in FIG. 16, and the same numerals designate the same constituents in FIG. 16 and their explanation is omitted.

Numerals 141a to 141f designate the circuit shown in FIG. 17, and the same numerals designate the same constituents in FIG. 17 and their explanation is omitted.

Furthermore, numeral 142 designates the circuit shown in FIG. 18, and the configurations of a block designated by character 143a and a block designated by numeral 143b are same, except that a circuit 141d in the block 143a is a circuit 142 in the block 143b.

In FIG. 14 and FIG. 15, numeral 144 in a circuit 14a designates a NAND gate, to one input of which a signal $Y_7$ is inputted, and to another input thereof a signal $Y_6$ is inputted, and its output serves as a signal $Z_5$ via an inverter 145.

Numeral 146 designates a 3-input NAND gate, to a first input of which, the signal $Y_7$ is inputted, to a second input, the signal $Y_6$ is inputted and to a third input, a signal $Y_5$ is inputted. An output of the NAND gate 146 serves as a signal $Z_4$ via an inverter 47.

Numeral 148 designates a 4-input NAND gate, to a first input of which, the signal $Y_7$ is inputted, to a second input, the signal $Y_5$ is inputted and to a fourth input, a signal $Y_4$ is inputted. An output of the NAND gate 148 serves as a signal $Z_3$ via an inverter 149.

Numeral 150 designates a NAND gate, to one input of which, a signal $Y_0$ is inputted and to another input thereof, a signal $Z_0$ is inputted. An output of the NAND gate 150 serves as an signal NC via an inverter 151.

The signal NC becomes "1" when the bit contents of the divisor D are similar to each other except the least significant bit.

When a value of the divisor is not "−1", the NAND gate 150 and the inverter 151 are not necessary.

In FIG. 19 and FIG. 20, numerals 152a to 152g designate input terminals of outputs $R_{j+1, 31}$ to $R_{j+1, 0}$ of the adder 10, and numerals 153a to 153g designate input terminals of outputs $R_{j+1, 31}*$ to $R_{j*1, 0}*$ of the same.

Numerals 154a to 154f designate input terminals of the signals $C_{30}$ to $C_0$.

Numeral 156 designates an inverter, an input of which is connected to the input terminal 155. Numerals 157a to 157f designate P-channel transistors, respective sources of which are connected to power potentials, and respective gates thereof are connected to an output of the inverter 156.

Numerals 159 and 160 designate input terminals inputting an upper 1 bit output of the first latch pair 4.

Since numerals 158a to 158r designate circuits having a same configuration, only a circuit configuration 158a is described.

Numeral 161 designates a 3-input NOR gate, a first input of which is connected to the input terminal 152a, a second input is connected to the input terminal 154a, and to a third input thereof, the first control signal $\phi_1$ is inputted.

Numeral 162 designates a 3-input NOR gate, a first input of which is connected tot he input terminal 153a, a second input is connected to the input terminal 154a, and to a third input thereof, the first control signal $\phi_1$ is inputted.

An output of the NOR gate 161 is given to a gate of an N-channel transistor 163. A source of the N-channel transistor 163 is grounded, and a drain is connected to a signal line which is connected to a drain of the P-channel transistor 157a.

An output of the NOR gate 162 is given to a gate of an N-channel transistor 164. A source of the N-channel transistor 164 is grounded, and a drain is connected to a signal line which is connected to a drain of the P-channel transistor 157b.

A signal line from the input terminal 154a is further wired to the blocks 158g, 158n, and connected to inputs of NOR gates of the blocks corresponding to the NOR gates 161, 162 of the block 158a.

Signal lines from the input terminals 154b to 154e are also same.

A signal line from the input terminal 154f is wired to the blocks 158f, 158l and 158m, and similarly, connected to the inputs of the NOr gates of respective blocks.

Numeral 166a to 166f designate circuits having a same configuration, so that only the configuration of the block 166a is described. Numeral 167 designates a weak latch, which prevents a state of the signal line connected to the drain of the P-channel transistor 157a from becoming a high impedance.

Numeral 168 designates a latch, which holds a state of the signal line connected tot he drain of the P-channel transistor 157a, and inverts it for output.

Numerals 169 to 174 designate output terminals of $X_2^{**}$, $X_2^*, X_1^{**}, X_1^*, X_0^{**}, X_0^*$.

Next, the operation is described.

The circuits shown in FIG. 14 and FIG. 15 receive the divisor D and decide the positions of $X_2$ to $X_0$. For example, when the divisor D is "001101 . . . ", a signal $C_{29}$ becomes "0". The signal $C_{29}$ is inputted to the NOR gates of the blocks 158b, 158h, 158o in the circuits shown in FIG. 19 and FIG. 20.

The signal line connected tot he drain of the P-channel transistors 157a to 157f shown in FIGS. 19 and 20 are precharged during the period where the first control signal $\phi_1$ is "1". When the first control signal $100_1$ becomes "0", since two inputs of the NOR gates of the blocks 158b, 158h, 158o become "0", the state of outputs $R_{j+1, 30}^{**}$ to $R_{j+1, 28}^*$ of the adder 10 is transmitted to the signal lines connected to the drains of the P-channel transistors 157a to 157f.

When the second control signal $\phi_2$ becomes "1", the state of the signal lines connected tot he drains of the P-channel transistors 157a to 157f is held by the latch 168 and the like, and inverted for output from the output terminals 169 to 174.

The coefficient extracting circuit 11 of this embodiment can also be applied to the conventional prior-art divider.

Next, the divisor register 8 is described. The divisor register 8 is so constituted that a division in the case where the divisor D is "−1" can be performed effectively.

Figure 21:
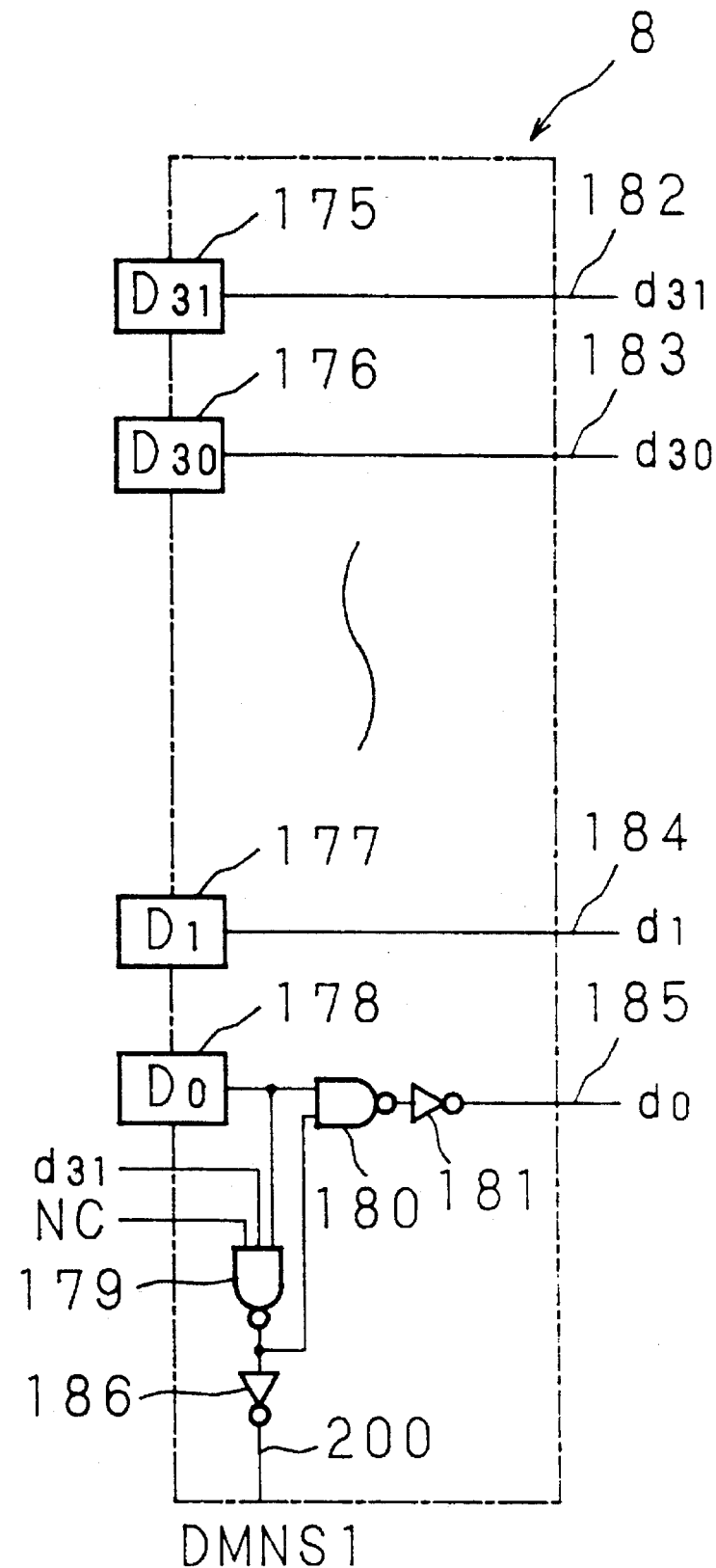
FIG. 21 is a circuit, diagram showing a configuration of a divisor register of a divider of the present invention.

FIG. 21 shows a circuit diagram showing a configuration of the divisor register 8.

In FIG. 21, numerals 175 to 178 designate memory cells which respectively hold the contents from the most significant bit 31 to the least significant bit 0 of the divisor D.

Numeral 179 designates a 3-input NAND gate, a first input of which connected to an output of the memory cell 178, to a second input thereof, the content $d_{31}$ of the most significant bit of the divisor D is inputted, and to a third input, the signal NC is inputted.

Numeral 180 designates a NAND gate, to one input of which the output of the memory cell 178 is inputted, and another input is connected too an output of the NAND gate 179. An output of the NAND gate serves as an output terminal 185 via an inverter 181.

Numeral 186 designates an inverter, an input of which is connected to the output of the NAND gate 179, and its output serves as an output terminal 200 of a signal DMNS1.

Numerals 182 to 185 designate output terminals which output the divisor, among which, though the output terminals 182 to 184 output the contents of the memory cells 175 to 177 intact, to the output terminal 185, an output of the inverter 181 is outputted.

When the divisor D is "−1", the NAND gate 179 outputs "0". In this case, the output terminals 182 to 185 output "−2", and the signal DNMS1 becomes "1".

Receiving the signal DNMS1, the quotient digit deciding circuit 2 inverts $R_{j+1, 0}^*$ and outputs it when the quotient digit $q_{j+1}$ is not "0". The $R_{j+1, 0}^*$ is inverted by the exclusive OR gate 73, NAND gate 74 and exclusive OR gate 51.

And hence, even when the divisor D is "−1", the division can be performed in the same way as the case where the divisor D is "−2". Thus, since it is not necessary to extend the divisor D to the lower direction to make the least significant bit of the divisor D apparently "0" to respond to the case where the divisor D is "−1", an excessive transistor is not necessary.

Next, a microcomputer including the divider of the present invention as mentioned above, specifically, the configuration of connection between the ALU, CPU and divider, is described with reference to block diagrams of FIG. 22 and FIG. 23.

Figure 22:
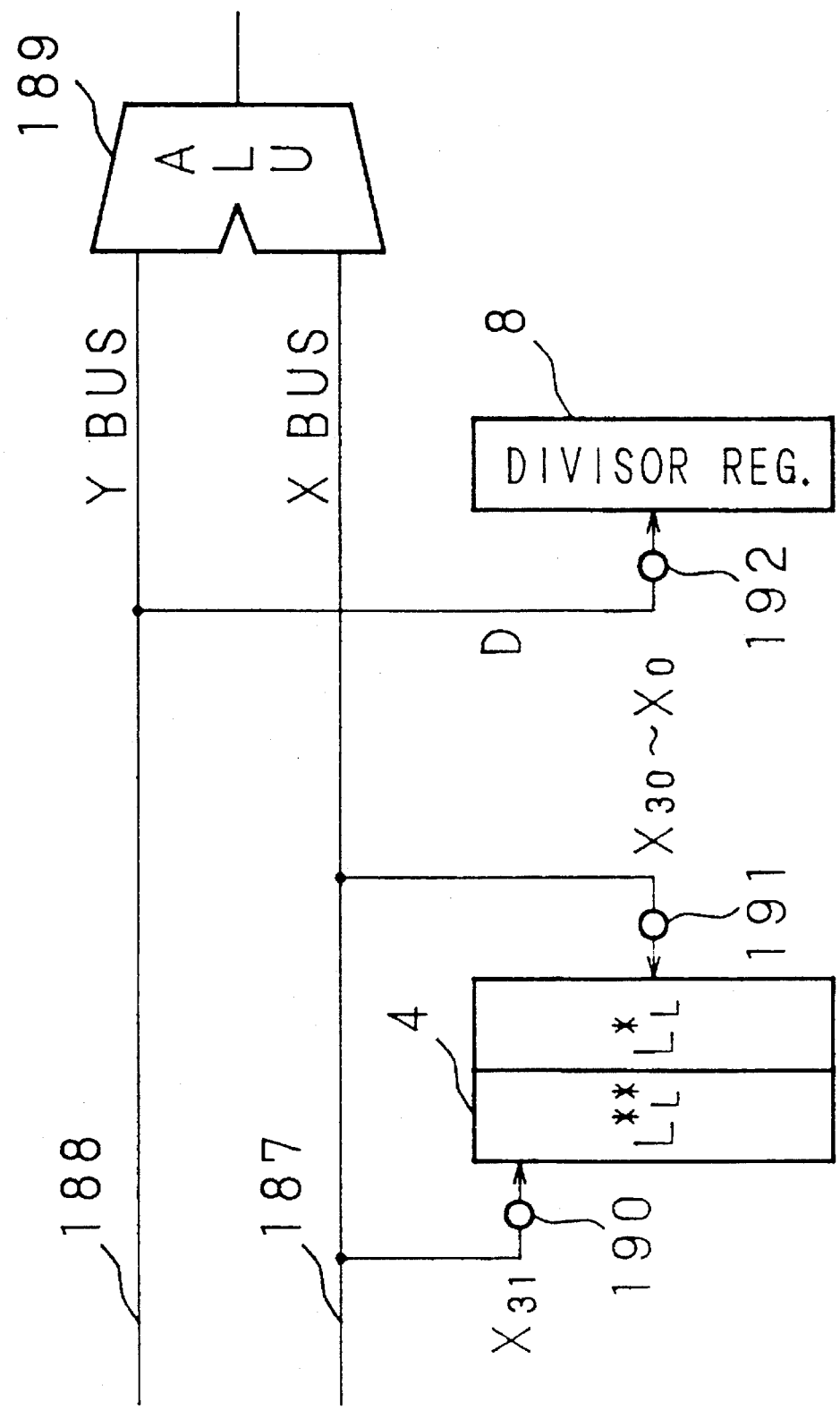
FIG. 22 is a block diagram showing an example of connection for instructing a division to a divider of the present invention from a microcomputer.

At first, in a first embodiment shown in FIG. 22, the connection between the CPU and the divider of the present invention having the basic configuration shown in FIG. 7 in the microcomputer, more specifically, the configuration for inputting the dividend and divisor to the divider of the present invention form the CPU side is shown.

In FIG. 22, numeral 187 designates an X bus in the CPU, numeral 188 designates a Y bus in the CPU and numeral 189 designates the ALU of the CPU.

though numerals 4 and 8 designate the first latch pair and the divisor register of the divider of the present invention shown in FIG. 7, other portions are omitted.

Numeral 190 designates gate means provided at a position connecting between the X bus 187 and a latch 400 holding a non-positive portion of the first latch pair 4 of the divider of the present invention, which writes the content of the most significant bit of the X bus 187, into the most significant bit of the latch 400 on the side storing the dividend $R_0^{}$ of the first latch pair 4**, and "0" into the other bits.

Numeral 191 designates gate means provided at a position connecting between the X bus 187 and a latch 401 holding a non-negative portion of the first latch pair 4 of the divider of the present invention, which writes the contents of the bits other than the most significant bit of the X bus 187, into the bits other than the most significant bits of the latch 401 on the side storing the dividend $R_0^*$ of the first latch pair 4, and "0" into the most significant bit.

Numeral 192 designates gate means provided at a position connecting between the Y bus 188 and the divisor register 8 of the divider of the present invention, which writes the content of bits of the Y bus 188 into bits of the divisor register 8.

In the case where the CPU is constituted to perform operations other than the division by the ALU 189, with data on the X bus 187 as an operand and data on the Y bus 188 as an operand, it is simply possible to constitute such that, against a division instruction, the content of dividend is outputted to the X bus 187 and the content of divisor to the Y bus 188.

When the aforementioned gate means 190, 191, 192 are operated simultaneously in such a case, the divider of the present invention is capable of taking the dividend into the first latch pair 4 and the divisor into the divisor register 8 simultaneously, and further, converting the dividend into the RSD representation from the twos complement representation.

The configuration of the microcomputer of this embodiment is also applicable in the divider, using the dividend or partial remainder represented by signed digits which is any of "−1", "0", "1".

As a next embodiment, a configuration of the microcomputer capable of reading a quotient and a remainder, which are the result of division, into the CPU effectively from the divider of the present invention is shown.

In FIG. 23, numeral 193 designates gate means, provided at a position connecting the Y bus 188 and a register 100 holding a non-positive portion of the first register pair 1, which outputs the content of the register 100 on the side storing the dividend (quotient) $R_0^*$ of the first register pair 1 to the Y bus 188.

Numeral 194 designates gate means, provided at a position connecting the X bus 187 and a register 101 holding a non-negative portion of the first register pair 1, which outputs the content of the register 101 on the side storing the dividend (quotient) $R_0^{**}$ of the first register pair 1 to the X bus 187.

Numeral 195 designates gate means, provided at a position connecting the Y bus 188 and a register 500 holding a non-positive portion of the second register pair 5, which outputs the content of the register 500 on the side storing the partial remainder $R_j^*$ of the second register pair 5 to the Y bus 188.

Numeral 196 designates gate means, provided at a position connecting the X bus 187 and a register 501 holding a non-negative portion of the second register pair 5, which outputs the content of the register 501 on the side storing the partial remainder $R_j^{**}$ of the second register pair 5 to the X bus 187.

In case of reading the quotient obtained by the divider of the present invention, at first, the gate means 193, 194 are operated simultaneously. Next, when a value outputted on the Y bus 188 is subtracted from a value outputted on the X bus 187 by an ALU 189, a quotient can be obtained as an output of the ALU 189.

On the same way, in case of reading the remainder, at first, the gate means 195, 196 are operated simultaneously. Next, when a value outputted on the Y bus 188 is subtracted from a value outputted on the X bus 187 by the ALU 189, a remainder can be obtained as an output of the ALU 189.

Since the ALU 189 includes a function of subtracted the value on the Y bus 188 from the value on the X bus 187, the number of transistors can be reduced, as compared with the case including a function of converting the quotient or remainder into the twos complement representation from the RSD representation in the divider.

The configuration of the microcomputer of this embodiment is also applicable to the divider using the dividend or partial remainder, wherein the quotient or remainder is represented by the signed digit which is any of "−1", "0", "1".

As particularly described heretofore, according to the divider of the present invention, the divider, which uses the RSD representation in the same way the prior art, and is capable of reducing the number of transistors in case of constituting an actual circuit by simplifying the tables for deciding the quotient digit, is realized.

Also, the divider, in which the divisor is not necessary to be standardized, by extracting a portion to be inputted to the quotient digit deciding means from the partial remainder according to the division value to decide the quotient digit, is realized.

Furthermore, the divider, in which the division can be performed even when the divisor is "−1", just by increasing a small number of transistors in case of constituting the actual circuit, is realized.

Furthermore, according to the microcomputer of the present invention, the microcomputer capable of writing the dividend and divisor effectively into the divider as aforementioned from the CPU, is realized.

Still further, the microcomputer capable of reading the quotient and remainder effectively into the CPU from the divider as aforementioned, is realized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A subtraction-shift-type divider using a dividend or partial remainder represented by signed digits taking any of the values −1, 0, 1, and a divisor by twos complement representation, comprising:

converting means for converting the divisor into any of the same value, inverter value and "0";

adding means for adding (subtracting) the partial remainder and output of said converting means, and next quotient digit deciding means for providing quotient digits, wherein said next quotient digit deciding means decides the next quotient digit from the quotient digits at respective time points during the execution of division, and a portion of the partial remainder obtained from the addition (subtraction) of said adding means, and conversion of the divisor by the converting means is in response to values of the quotient digit at respective time points during the execution of division.

2. A subtraction-shift-type divider using a dividend or partial remainder represented by signed digits taking any of the values −1, 0, 1, and a divisor by twos complement representation, comprising:

converting means for converting the divisor into any of the same value, inverter value and "0";

adding means for adding (subtracting) the partial remainder and output of said converting means, next quotient digit deciding means for providing quotient digits, a next quotient digit being decided by using a portion of the partial remainder obtained by the subtraction of said adding means responding to quotient digits at respective time points during the execution of division, and extracting means for extracting a portion from the partial remainder for deciding the next quotient digit by said quotient digit deciding means responding to the divisor value.

3. A divider as set forth in claim 2, further comprising, means for converting a divisor into "−2" when the divisor is "−1".

* * * * *